US008847935B2

(12) United States Patent
Yamashita et al.

(10) Patent No.: US 8,847,935 B2
(45) Date of Patent: Sep. 30, 2014

(54) DISPLAY DEVICE AND ELECTRONIC PRODUCT HAVING LIGHT SENSORS IN PLURAL PIXEL REGIONS

(75) Inventors: Junichi Yamashita, Tokyo (JP); Katsuhide Uchino, Kanagawa (JP)

(73) Assignee: Sony Corporation, Tokyo (JP)

(*) Notice: Subject to any disclaimer, the term of this patent is extended or adjusted under 35 U.S.C. 154(b) by 586 days.

(21) Appl. No.: 12/588,520

(22) Filed: Oct. 19, 2009

(65) Prior Publication Data

US 2010/0118003 A1 May 13, 2010

(30) Foreign Application Priority Data

Nov. 7, 2008 (JP) ................................ 2008-286781

(51) Int. Cl.
*G06F 3/038* (2013.01)
*G09G 3/20* (2006.01)
*G09G 3/30* (2006.01)
*G09G 3/32* (2006.01)
*G09G 5/00* (2006.01)
*G01J 1/32* (2006.01)

(52) U.S. Cl.
CPC ........ *G09G 3/3233* (2013.01); *G09G 2320/045* (2013.01); *G09G 2360/147* (2013.01); *G09G 2320/046* (2013.01); *G09G 2360/145* (2013.01)
USPC ................ 345/205; 345/55; 345/76; 345/77; 345/83; 345/207; 250/205

(58) Field of Classification Search
USPC .......................................................... 345/205
See application file for complete search history.

(56) References Cited

U.S. PATENT DOCUMENTS

2003/0227262 A1 12/2003 Kwon
2004/0046164 A1 3/2004 Kobayashi et al.
2004/0070557 A1 4/2004 Asano et al.
2005/0088574 A1* 4/2005 Suzuki et al. ................. 348/663
2005/0093466 A1* 5/2005 Matsumoto ................ 315/169.3
2005/0206590 A1 9/2005 Sasaki et al.
2006/0044234 A1* 3/2006 Shimonishi ..................... 345/77
2006/0088275 A1* 4/2006 O'Dea et al. .................... 386/46
2006/0132653 A1* 6/2006 Higashi ......................... 348/556

(Continued)

FOREIGN PATENT DOCUMENTS

CN 1710642 A 12/2005
CN 1781135 A 5/2006
CN 1945405 A 4/2007
CN 101123066 A 2/2008

(Continued)

*Primary Examiner* — Joseph Feild
*Assistant Examiner* — K. Kiyabu
(74) *Attorney, Agent, or Firm* — Rader, Fishman & Grauer PLLC

(57) ABSTRACT

A display device includes: a screen unit; a drive unit; a signal processing unit; and a selector, wherein the screen unit includes rows of scanning lines, columns of signal lines, matrix-state pixel circuits and a light sensor, the drive unit includes a scanner supplying a control signal to the scanning lines and a driver supplying a video signal to the signal lines, the screen unit is sectioned into plural regions each having plural pixel circuits, the pixel circuit emits light in accordance with the video signal, the light sensor is arranged with respect to each region and outputs a luminance signal in accordance with the light emission, the selector supplies plural luminance signals to the signal processing unit by switching the signals, and the signal processing unit corrects the video signal in accordance with the luminance signals and supplies the video signal to the driver.

6 Claims, 32 Drawing Sheets

(56) References Cited

U.S. PATENT DOCUMENTS

| | | | | |
|---|---|---|---|---|
| 2006/0170628 | A1 | 8/2006 | Yamashita et al. | |
| 2006/0227085 | A1* | 10/2006 | Boldt et al. | 345/83 |
| 2006/0273999 | A1* | 12/2006 | Yamazaki et al. | 345/81 |
| 2007/0285378 | A1* | 12/2007 | Lankhorst et al. | 345/102 |
| 2008/0036703 | A1* | 2/2008 | Wang et al. | 345/76 |
| 2008/0084222 | A1 | 4/2008 | Yen | |
| 2008/0106649 | A1* | 5/2008 | Prusia et al. | 348/701 |
| 2008/0198103 | A1* | 8/2008 | Toyomura et al. | 345/77 |
| 2008/0245949 | A1* | 10/2008 | Morimoto et al. | 250/205 |
| 2009/0027319 | A1* | 1/2009 | Chen | 345/87 |
| 2009/0066614 | A1* | 3/2009 | Ishii et al. | 345/76 |
| 2009/0231313 | A1* | 9/2009 | Teranishi et al. | 345/207 |
| 2010/0053045 | A1* | 3/2010 | Fish et al. | 345/82 |

FOREIGN PATENT DOCUMENTS

| | | | |
|---|---|---|---|
| EP | 1 959 419 | A2 | 8/2008 |
| JP | 2003-255856 | | 9/2003 |
| JP | 2003-271095 | | 9/2003 |
| JP | 2004-029791 | | 1/2004 |
| JP | 2004-093682 | | 3/2004 |
| JP | 2004-133240 | | 4/2004 |
| JP | 2005-092028 | A | 4/2005 |
| JP | 2006-058352 | A | 3/2006 |
| JP | 2006-215213 | | 8/2006 |
| JP | 2010-113227 | A | 5/2010 |
| TW | 200818095 | A | 4/2008 |
| TW | 200836559 | A | 9/2008 |
| WO | WO-2007/132835 | A1 | 11/2007 |
| WO | WO 2007132835 | A1 * | 11/2007 |

* cited by examiner (X)

LUMINANCE SIGNAL IN ROW DIRECTION (Y)

LUMINANCE SIGNAL IN COLUMN DIRECTION

PLURAL SENSORS PARALLEL DRIVE

PLURAL SENSORS PHASE SHIFT PARALLEL DRIVE

DISPLAY DEVICE AND ELECTRONIC PRODUCT HAVING LIGHT SENSORS IN PLURAL PIXEL REGIONS

BACKGROUND OF THE INVENTION

1. Field of the Invention

The present invention relates to a display device displaying images by current-driving a light emitting element arranged at each pixel. The invention also relates to an electronic product using the display device. Particularly, the invention relates to a drive system of a so-called active matrix display device, which controls a current amount flowing in the light emitting element such as an organic EL element by an insulated-gate field effect transistor provided in each pixel circuit.

2. Description of the Related Art

In display devices, for example, in a liquid crystal display, a large number of pixels are arranged in a matrix state and images are displayed by controlling transmission intensity or reflection intensity of incident light in each pixel in accordance with image information to be displayed. This is the same as in an organic EL display in which organic EL elements are used for pixels, however, the organic EL element is a self-luminous element which is different from a liquid crystal pixel. Accordingly, the organic EL display has advantages, for example, visibility of images is higher, a backlight is not necessary and response speed is higher as compared with the liquid crystal display. Additionally, the luminance level (gray scale) of each light emitting element can be controlled by a current value flowing in each element, and the organic EL display is largely different from the liquid crystal display which belongs to a voltage control type in a point that it belongs to a so-called current control type.

The organic EL display has a passive matrix type and an active matrix type as a drive system thereof in the same manner as the liquid crystal display. The former has problems such that it is difficult to realize a large-sized as well as high-definition display though the structure is simple, therefore, the active matrix type is extensively developed at present. In this type, electric current flowing in the light emitting element in each pixel circuit is controlled by an active element (commonly, a thin-film transistor, TFT) provided in the pixel circuit, which is written in the following Patent Documents.

[Patent Document 1] JP-A-2003-255856

[Patent Document 2] JP-A-2003-271095

[Patent Document 3] JP-A-2004-133240

[Patent Document 4] JP-A-2004-029791

[Patent Document 5] JP-A-2004-093682

[Patent Document 5] JP-A-2006-215213

SUMMARY OF THE INVENTION

The display device in related art basically includes a screen unit and a drive unit. The screen unit has rows of scanning lines, columns of signal lines and matrix-state pixels arranged at portions where respective scanning lines and respective signal lines intersect. The drive unit is arranged on the periphery of the screen unit, including a scanner sequentially supplying a control signal to respective scanning lines and a driver supplying a video signal to respective signal lines. Each pixel in the screen unit takes a video signal from a corresponding signal line when selected in accordance with the control signal supplied from a corresponding scanning line as well as emits light in accordance with the taken video signal.

Each pixel includes, for example, an organic EL device as a light emitting element. In the light emitting element, current/luminance characteristics tend to deteriorate with time. Accordingly, there is a problem that luminance of each pixel in the organic EL display is reduced with lapse of time. The degree of luminance reduction depends on cumulative light emitting time of each pixel. When the cumulative light emitting time differs in respective pixels in the screen, luminance nonuniformity may occur and an image quality failure called "burn-in" is liable to occur.

In view of the above, it is desirable to provide a display device which is capable of compensating luminance reduction in pixels.

According to an embodiment of the invention, there is provided a display device including a screen unit, a drive unit, a signal processing unit, and a selector. The screen unit includes rows of scanning lines, columns of signal lines, matrix-state pixel circuits and a light sensor. The drive unit includes a scanner supplying a control signal to the scanning lines and a driver supplying a video signal to the signal lines. The screen unit is sectioned into plural regions each having plural pixel circuits. The pixel circuit emits light in accordance with the video signal. The light sensor is arranged with respect to each region and outputs a luminance signal in accordance with the light emission. The selector supplies plural luminance signals to the signal processing unit by switching the signals. The signal processing unit corrects the video signal in accordance with the luminance signals and supplies the video signal to the driver.

It is preferable that plural light sensors arranged so as to correspond to plural regions are grouped into blocks by a given number of sensors and the signal processing unit processes the luminance signals by each block. The display device further includes a converter converting analog luminance signals outputted from the light sensors into digital luminance signals and supplying the signals into the signal processing unit, in which the converter is arranged so as to correspond to each block. The display device further includes amplifier amplifying the luminance signals outputted from the light sensors and supplying the signals to the signal processing unit, in which the amplifier is arranged so as to correspond to each block. The signal processing unit supplies a video signal for display during a display period in which video is displayed in the screen unit and supplies a video signal for detection during a detection period in which video is not displayed in the screen unit. The signal processing unit supplies the video signal for detection in each frame and allows only pixel circuits of detection targets to emit light. The signal processing unit compares a first luminance signal outputted from the light sensor during a first period with a second luminance signal outputted from the light sensor during a second period after the first period, corrects the video signal in accordance with the comparison result and supplies the signal to the driver.

According to the embodiment of the invention, the signal processing unit corrects the video signal in accordance with the luminance signal outputted from the light sensor as well as supplies the corrected video signal to the driver of the drive unit. According to the configuration, it is possible to compensate luminance deterioration of pixels by the correction of the video signal, as a result, image quality failures such as "burn-in" which have been problems from the past can be prevented.

According to the embodiment of the invention, the light sensor detects light emitting luminance of each pixel and outputs a corresponding luminance signal. Since the light emitting luminance is detected with respect to each individual pixel, partial luminance nonuniformity can be corrected by correcting the video signal in each pixel even when partial nonuniformity occurs in the screen.

Particularly, in the embodiment of the invention, the screen unit is sectioned and the light sensor is arranged with respect to each section. Each section includes a number of pixels in a range in which the corresponding light sensor can detect light emitting luminance. According to the embodiment of the invention, it is not necessary to provide light sensors so as to correspond to respective pixels for detecting light emitting luminance of each pixel, therefore, the necessary number of light sensors can be drastically reduced, as a result, it is possible to simplify a display panel structure as well as to reduce costs for the display panel.

Furthermore, in a display device according to an embodiment, a selector is arranged between the panel and the signal processing unit (for example, a DSP). The selector supplies luminance signals outputted from plural light sensors arranged so as to correspond to plural regions by switching the signals. It is possible to reduce the number of wirings connecting between plural light sensors and the signal processing unit by interposing the selector. When the signal processing unit includes an IC chip (for example, a FPGA or an ASIC), the number of pins for connecting to the plural light sensors can be reduced. Accordingly, a general-purpose IC chip can be used even when the number of light sensors exceeds the number of pins of the DSP.

Further, according to the embodiment of the invention, plural light sensors are grouped into blocks by a given number of sensors. The signal processing unit receives luminance signals by each block, and performs correction processing of the video signal based on the luminance signals. In order to process analog luminance signals outputted from the light sensors in the signal processing unit (for example, the DSP), an amplifier for amplifying analog luminance signals or a converter converting analog data of amplified luminance signals into digital data are necessary. According to the embodiment of the invention, the light sensors are grouped into blocks by a given number of sensors, thereby using the amplifier and converter in common by the light sensors which are grouped into blocks, which realizes reduction of the number of components.

DESCRIPTION OF THE PREFERRED EMBODIMENTS

Hereinafter, the preferred embodiments (referred to as embodiments in the following description) will be explained. The explanation will be made in the following order.

First Embodiment
Second Embodiment
Third Embodiment
Fourth Embodiment
Fifth Embodiment
Sixth Embodiment
Seventh Embodiment
Application Example First Embodiment

[Whole Configuration of a Panel]

Figure 1:
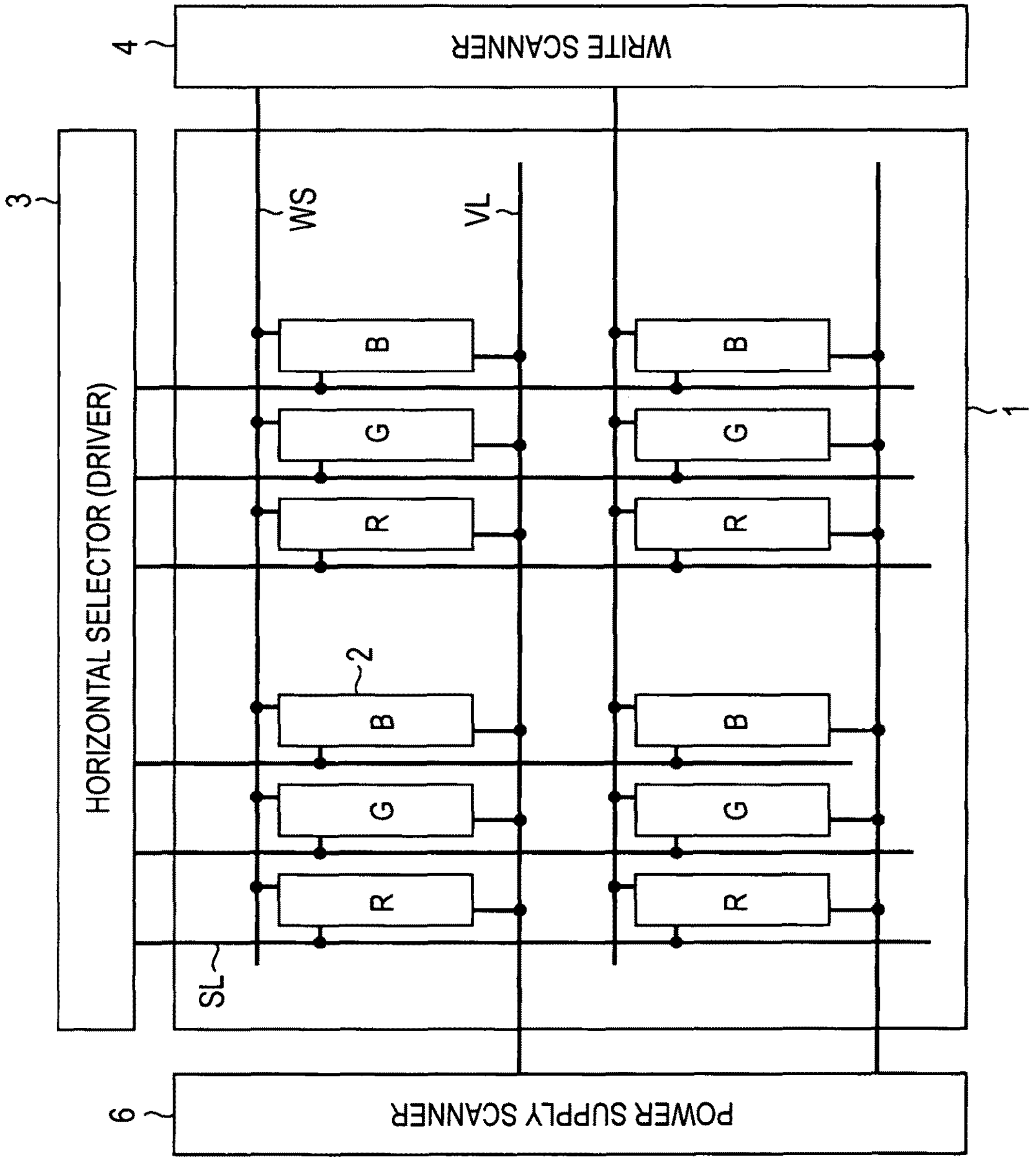
FIG. 1 is a block diagram of a panel of a display device according to a first embodiment of the invention.

FIG. 1 is the whole configuration diagram showing a panel which is a main unit of a display device according to the embodiment of the invention. As shown in the drawing, the display device includes a pixel array unit 1 (screen unit) and a drive unit which drives the pixel array unit 1. The pixel array unit 1 has rows of scanning lines WS, columns of signal lines SL, matrix-state pixels 2 arranged at portions where the both lines intersect and feeding lines (power lines) VL arranged so as to correspond to respective lines of respective pixels 2. In the example, any of RGB three primary colors is assigned to each pixel 2 to realize color display. However, the invention is not limited to this and also includes a single-color display device. The drive unit includes a write scanner 4 performing line-sequential scanning of the pixels 2 row by row by sequentially supplying a control signal to respective scanning lines WS, a power supply scanner 6 supplying a power supply voltage which switches between a first voltage and a second voltage to respective feeding lines VL so as to correspond to the line-sequential scanning and a horizontal selector (signal driver) 3 supplying a signal potential and a reference potential to be a video signal to rows of signal lines SL so as to correspond to the line-sequential scanning.

[Circuit Configuration of a Pixel]

Figure 2:
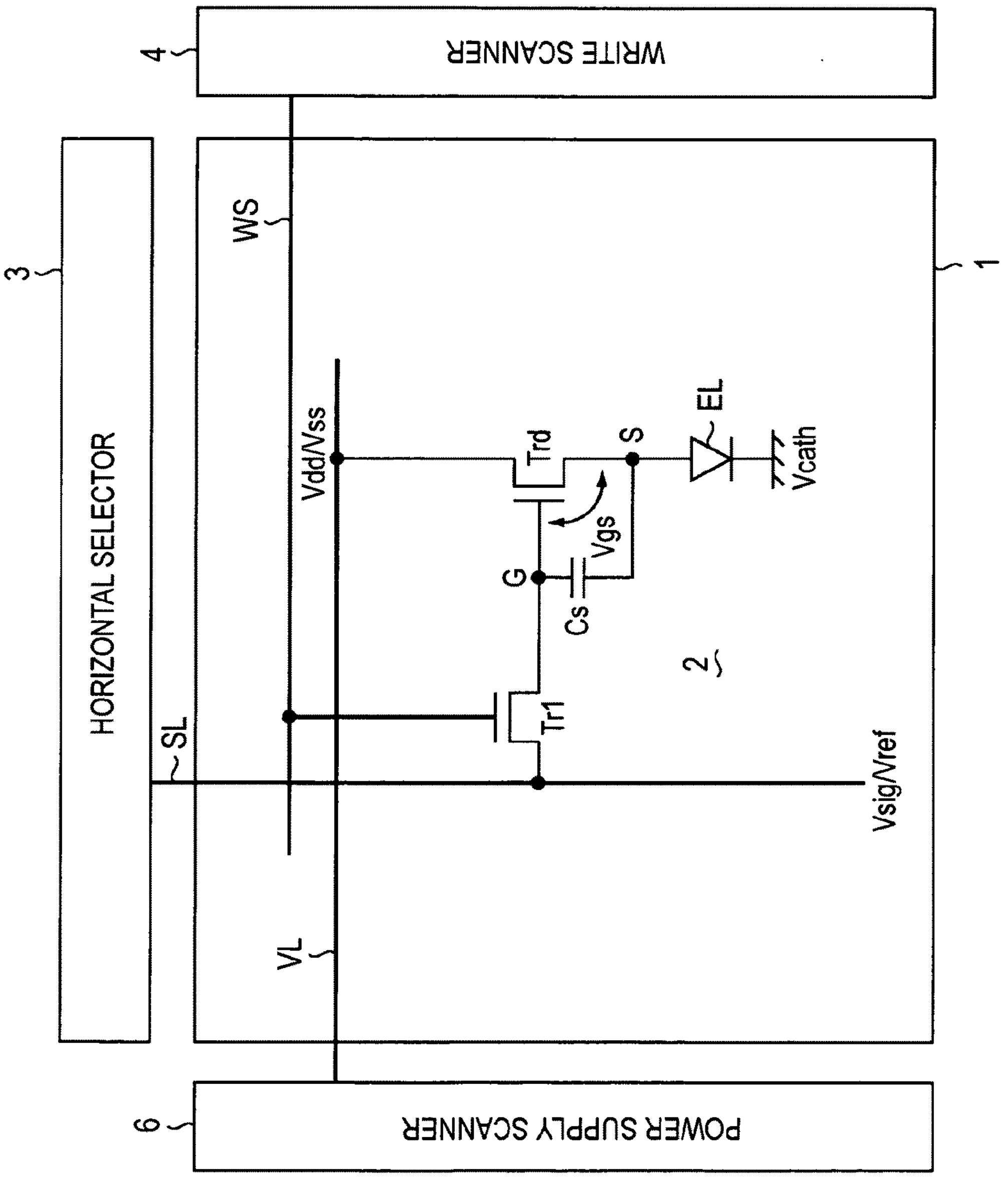
FIG. 2 is a pixel circuit diagram according to the first embodiment.

FIG. 2 is a circuit diagram showing specific configuration and connection relation of the pixel 2 included in the display device shown in FIG. 1. As shown in the drawing, the pixel 2 includes a light emitting element EL which is typified by an organic EL device and the like, a sampling transistor Tr1, a drive transistor Trd and a pixel capacitor Cs. The sampling transistor Tr1 is connected to a corresponding scanning line WS at a control end (gate) thereof, connected to a corresponding signal line SL at one of a pair of current ends (source/drain) and connected to a control end (gate G) of the drive transistor Trs at the other of the current ends. The drive transistor Trd is connected to the light emitting element EL at one of a pair of current ends (source/drain) and connected to a corresponding feeding line VL at the other of the current ends. In the example, the drive transistor Trd is an N-channel type, in which the drain thereof is connected to the feeding line VL and the source S is connected to an anode of the light emitting element EL as an output node. A cathode of the light emitting element EL is connected to a given cathode potential Vcath. The pixel capacitor Cs is connected between the source S as one of the current ends of the drive transistor Trd and the gate G which is the control end.

In the above configuration, the sampling transistor Tr1 becomes conductive in accordance with a control signal supplied from the scanning line WS, performing sampling of a signal potential supplied from the signal line SL to store the potential in the pixel capacitor Cs. The drive transistor Trd receives current supply from the feeding line VL in a first potential (high potential Vdd), allowing drive current to flow into the light emitting element EL in accordance with the signal potential stored in the pixel capacitor Cs. The write scanner 4 outputs a control signal having a given pulse width to the control line WS for allowing the sampling transistor Tr1 to be conductive in a time slot in which the signal line SL is in the signal potential, thereby storing the signal potential in the pixel capacitor Cs as well as adding correction with respect to a mobility μ of the drive transistor Trd to the signal potential. After that, the drive transistor Trd supplies drive current corresponding to the signal potential Vsig written in the pixel capacitor Cs to the light emitting element EL, proceeding to a light emitting operation.

The pixel circuit 2 also includes a threshold voltage correction function in addition to the mobility correction function described above. Specifically, the power supply scanner 6 switches the feeding line VL from the first potential (high potential Vdd) to a second potential (low potential Vss) at a first timing before the sampling transistor Tr1 samples the signal potential Vsig. The write scanner 4 allows the sampling transistor Tr1 to be conductive at a second timing to apply a reference potential Vref from the signal line SL to the gate G of the drive transistor Trd as well as set the source S of the drive transistor Trd to the second potential (Vss) also before the sampling transistor Tr1 samples the signal potential Vsig. The power supply scanner 6 switches the feeding line VL from the second potential Vss to the first potential Vdd at a third timing after the second timing to store a voltage corresponding to a threshold voltage Vth of the drive transistor Trd in the pixel capacitor Cs. According to the above threshold voltage correction function, the display device can cancel effects of the threshold voltage Vth of the drive transistor Trd which varies according to the pixel.

The pixel circuit 2 also includes a bootstrap function. That is, the write scanner 4 releases the application of the control signal to the scanning line WS in a stage when the signal potential Vsig is stored in the pixel capacitor Cs to allow the sampling transistor Tr1 to be a non-conductive state and to electrically cut off the gate G of the drive transistor Trd from the signal line SL, thereby allowing the potential of the gate G to change with a potential change of the source S of the drive transistor Trd and maintaining a voltage Vgs between the gate G and the source S to be constant.

[Timing Chart 1]

Figure 3:
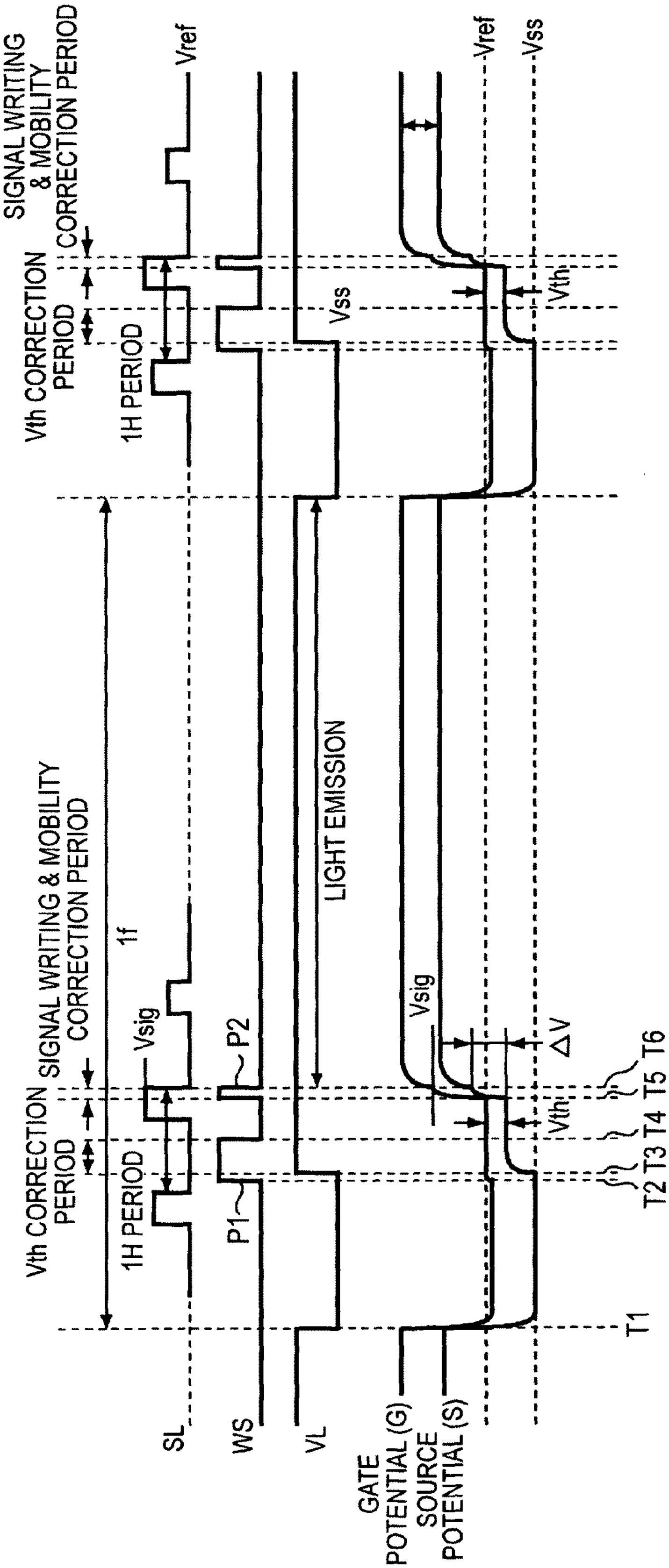
FIG. 3 is a timing chart for explaining operations of the first embodiment.

FIG. 3 is a timing chart for explaining operations of the pixel circuit 2 shown in FIG. 2. In the drawing, a potential change of the scanning line WS, a potential change of the feeding line VL and a potential change of the signal line SL are represented in a time axis common to these lines. Additionally, potential changes of the gate G and the source S of the drive transistor are also represented in parallel to these potential changes.

A control signal pulse for turning on the sampling transistor Tr1 is applied to the scanning line WS. The control signal pulse is applied to the scanning line WS in one frame (1/*f*) period so as to correspond to ling-sequential scanning of the pixel array unit. The control signal pulse includes two pulses during one horizontal scanning period (1H). The first pulse is sometimes referred to as a first pulse P1 and the succeeding pulse is referred to as a second pulse P2. The feeding line VL switches between the high potential Vdd and the low potential Vss also during one frame period (1/*f*). A video signal switching between the signal potential Vsig and the reference signal Vref during one horizontal scanning period (1H) is supplied to the signal line SL.

As shown in the timing chart of FIG. 3, the pixel enters a non-light emitting period in the present frame from a light emitting period in the previous frame, then, proceeding to the light emitting period in the present frame. In the non-light emitting period, a preparation operation, a threshold voltage correction operation, a signal writing operation, a mobility correction operations and the like are performed.

In the light emitting period of the previous frame, the feeding line VL is in the high potential Vdd, and the drive transistor Trd supplies a drive current Ids to the light emitting element EL. The drive current Ids passes the light emitting element EL from the feeding line VL in the high potential Vdd through the drive transistor Trd, flowing into the cathode line.

Subsequently, in the non-emitting period of the present frame, the feeding line VL is switched from the high potential Vdd to the low potential Vss at a timing T1. According to this, the feeding line VL is discharged to be Vss, and further, the source S of the drive transistor Trd is reduced to Vss. Accordingly, an anode potential of the light emitting element EL (that is, the source potential of the drive transistor Trd) is in a reverse bias state, therefore, the drive current does not flow and light is turned off. The potential of the gate G is also reduced with the potential reduction of the source S of the drive transistor Trd.

Next, at a timing T2, the sampling transistor Tr1 becomes conductive by switching the scanning line WS from the low level to the high level. At this time, the signal line SL is in the reference potential Vref. Therefore, the potential of the gate G of the drive transistor Trd is in the reference potential Vref of hte signal line SL through the conductive sampling transistor Tr1. At this time, the source S of the drive transistor Trd is in the potential Vss which is sufficiently lower than Vref. In the above manner, the voltage Vgs between the gate G and the source S of the drive transistor Trd is initialized so that it becomes larger than the threshold voltage Vth of the drive transistor Trd. A period T1-T3 from the timing T1 to a timing T3 corresponds to a preparation period in which the voltage Vgs between the gate G and the source S of the drive transistor Trd is set to Vth or more in advance.

After that, in the timing T3, the feeding line VL makes a transition from the low potential Vss to the high potential Vdd, and the potential of the source S of the drive transistor Trd starts increasing. Then, the current is cut off when the voltage Vgs between the gate G and the source S of the drive transistor Trd becomes the threshold voltage Vth. In this manner, the voltage corresponding to the threshold voltage Vth of the drive transistor Trd is written in the pixel capacitor Cs. This is the threshold voltage correction operation. At this time, the cathode potential Vcath is set in order that the light emitting element EL is cut off for the purpose of allowing the current to flow in the pixel capacitor Cs side exclusively and not to flow into the light emitting element EL.

At a timing T4, the scanning line WS returns to the low level from the high level. In other words, the first pulse P1 applied to the scanning line WS is released to allow the sampling transistor to be turned off. As apparent from the above explanation, the first pulse P1 is applied to the gate of the sampling transistor Tr1 to perform the threshold voltage correction operation.

After that, the signal line SL switches from the reference potential Vref to the signal potential Vsig. Subsequently, the scanning line WS rises from the low level to the high level again at a timing T5. In other words, the second pulse P2 is applied to the gate of the sampling transistor Tr1. Accordingly, the sampling transistor Tr1 is turned on again and samples the signal potential Vsig from the signal line SL. Therefore, the potential of the gate G of the drive transistor Trd becomes the signal potential Vsig. Here, since the light emitting element EL is in the cut-off state (high-impedance state) first, current flowing between the drain and the source of the drive transistor Trd flows into the pixel capacitor Cs and an equivalent capacitor of the light emitting element EL exclusively to start charging. After that, the potential of the source S of the drive transistor Trd is increased by ΔV until a timing T6 when the sampling transistor Tr1 is turned off. Accordingly, the signal potential Vsig of the video signal is written in the pixel capacitor Cs by being added to Vth as well as the voltage ΔV for mobility correction is subtracted from the voltage stored in the pixel capacitor Cs. Therefore, a period T5-T6 from the timing T5 to the timing T6 corresponds to a signal writing period and a mobility correction period. In other words, when the second pulse P2 is applied to the scanning line WS, the signal writing period and the mobility correction period are performed. The signal writing operation and the mobility correction operation T5-T6 are equal to a pulse width of the second pulse P2. That is, the pulse width of the second pulse P2 prescribes the mobility correction period.

As described above, writing of the signal potential Vsig and the adjustment of the correction amount ΔV are performed at the same time in the signal writing period T5-T6. The higher Vsig is, the higher the current Ids supplied by the drive transistor Trd becomes, and the higher an absolute value of ΔV becomes. Therefore, the mobility correction corresponding to a light emitting luminance level is performed. When Vsig is fixed, the absolute value of ΔV becomes larger as the mobility μ of the drive transistor Trd is higher. In other words, the higher the mobility μ is, the higher a negative feedback amount ΔV to the pixel capacitor Cs becomes, therefore, variation of the mobility μ in each pixel can be cancelled.

Lastly, at a timing T6, the scanning line WS makes a transition to the low-level side as described above and the sampling transistor Tr1 is turned off. Accordingly, the gate G of the drive transistor Trd is cut off from the signal line SL. At this time, the drain current Ids start flowing in the light emitting element EL. Accordingly, the anode potential of the light emitting element EL increases in accordance with the drive current Ids. The increase of the anode potential of the light emitting element EL is precisely the potential increase of the source S of the drive transistor Trd. When the potential of the source S of the drive transistor Trd increases, the potential of the gate G of the drive transistor Trd also increases by the bootstrap operation of the pixel capacitor Cs. An increase amount of the gate potential will be equal to an increase amount of the source potential. Therefore, the input voltage Vgs between the gate G and the source S of the drive transistor Trd is maintained to be constant during the light emitting period. A value of the gate voltage Vgs has received correction of the threshold voltage Vth and the mobility μ to the signal potential Vsig. The drive transistor Trd operates in a saturation region. That is, the drive transistor Trd outputs the drive current Ids corresponding to the input voltage Vgs between the gate G and the source S. The value of the gate voltage Vgs has received correction of the threshold voltage Vth and the mobility μ to the signal potential Vsig.

[Timing Chart 2]

Figure 4:
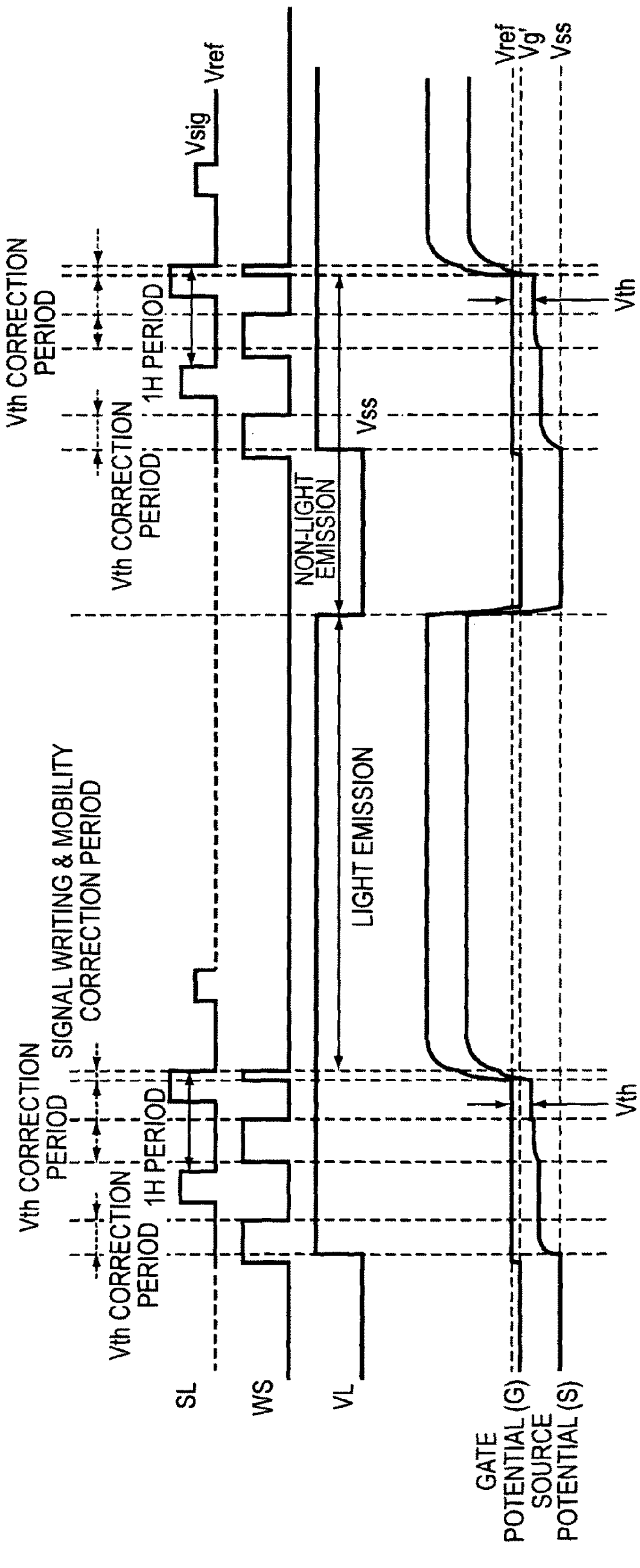
FIG. 4 is also a timing chart for explaining operations.

FIG. 4 is another timing chart for explaining operations of the pixel circuit 2 shown in FIG. 2. The drawing is basically the same as the timing chart shown in FIG. 3, and corresponding reference codes are given to corresponding portions. A different point is that the threshold voltage correction operation is performed repeatedly over plural horizontal periods in a time-division manner. In the example of the timing chart of FIG. 4, the Vth correction operation in each 1H period is performed twice. When the screen unit becomes the high definition one, the number of pixels is increased and the number of scanning lines is also increased. The 1H period becomes shorter by the increase of the number of scanning lines. As the line-sequential scanning is performed at higher speed, there is a case in which the Vth correction operation is not completed in the 1H period. Accordingly, in the timing chart of FIG. 4, the threshold correction operation is performed twice in the time-division manner, so that the potential Vgs between the gate G and the source S of the drive transistor Trd is initialized to Vth reliably. The number of repeating the Vth correction is not limited to twice but the number of time division can be increased if necessary.

[Whole Configuration of the Display Device]

Figure 5:
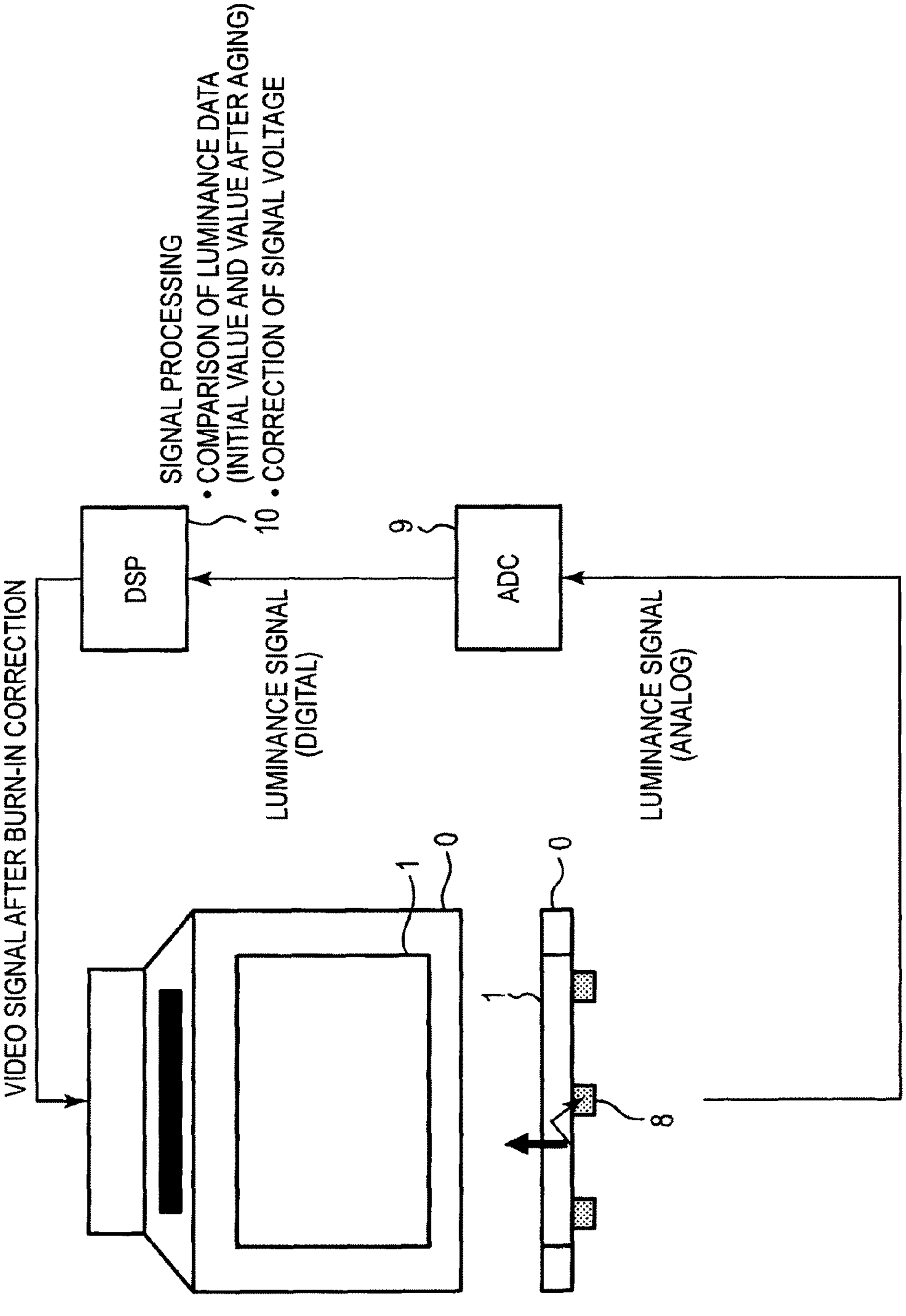
FIG. 5 is a block diagram showing the whole configuration of the first embodiment.

FIG. 5 is a schematic block diagram showing the whole configuration of the display device according to the embodiment of the invention. As shown in the drawing, the display device basically includes a screen unit 1, a drive unit and a signal processing unit 10. The screen unit (pixel array unit) 1 has a panel "0" including rows of scanning lines, columns of signal lines, matrix-state pixels arranged at portions where respective scanning lines and respective signal lines intersect and a light sensor 8. The drive unit includes a scanner sequentially supplying a control signal to respective scanning lines and a driver supplying a video signal to respective signal lines. The scanner and the driver are mounted on the panel "0" so as to surround the screen unit 1 in the embodiment.

Each pixel included in the screen unit 1 takes a video signal from a corresponding signal line as well as emits light in accordance with the taken video signal when the pixel is selected in accordance with the control signal supplied from a corresponding scanning line. The light sensor 8 detects light emitting luminance of each pixel and outputs a corresponding luminance signal. In the embodiment, the light sensor 8 is mounted on the reverse side (opposite side to the light emitting surface) of the panel "0".

The signal processing unit (DSP) 10 corrects the video signal in accordance with the luminance signal outputted from the light sensor 8 as well as supplies the corrected video signal to the driver in the drive unit. In the embodiment, an AD converter (ADC) 9 is inserted between the light sensor 8 and the signal processing unit 10. The ADC 9 converts the analog luminance signal outputted from the light sensor 8 into a digital luminance signal (luminance data) and supplies the signal to the digital signal processing unit (DSP) 10.

As a feature matter of the embodiment of the invention, the panel "0" is sectioned into plural regions in the screen unit (pixel array unit) 1, and the light sensors 8 are arranged so as to correspond to respective regions. Each light sensor 8 detects light emitting luminance of pixels belonging to a corresponding region and supplies corresponding luminance signals to the signal processing unit 10. The light sensor 8 is preferably arranged at the center of the corresponding region.

The signal processing unit 10 supplies a normal video signal to the driver during a display period in which video is displayed in the screen unit 1, and supplies a video signal for luminance detection to the driver during a detection period included in a non-display period in which video is not displayed. The signal processing unit 10 supplies the video signal for detection in each frame (or in each field). The video signal for detection allows only pixels of detection targets in one frame (or one field) to emit light and allows the remaining pixels to be in a non-light emitting state. The signal processing unit 10 calculates a reduction amount of light emitting luminance in each pixel by comparing a first luminance signal outputted from the light sensor 8 at an initial stage (for example, at the time of factory shipping of the product) with a second luminance signal outputted from the light sensor 8 after a given time has passed from the initial stage, correcting the video signal so as to compensate the calculated reduction amount of the light emitting luminance to output the amount to the driver in the drive unit.

As apparent from the above explanation, the light sensor 8 is provided at the panel "0" in the embodiment of the invention. The luminance deterioration of each pixel is measured by using the light sensor 8 and a level of the video signal is adjusted so as to correspond to the deterioration degree. Accordingly, it is possible to display an image in which "burn-in" is corrected in the screen 1. Particularly, in the embodiment, one light sensor 8 is arranged with respect to plural pixels. Accordingly, the number of light sensors can be drastically reduced and costs for the burn-in correction system can be reduced.

[Modification Example]

Figure 6:
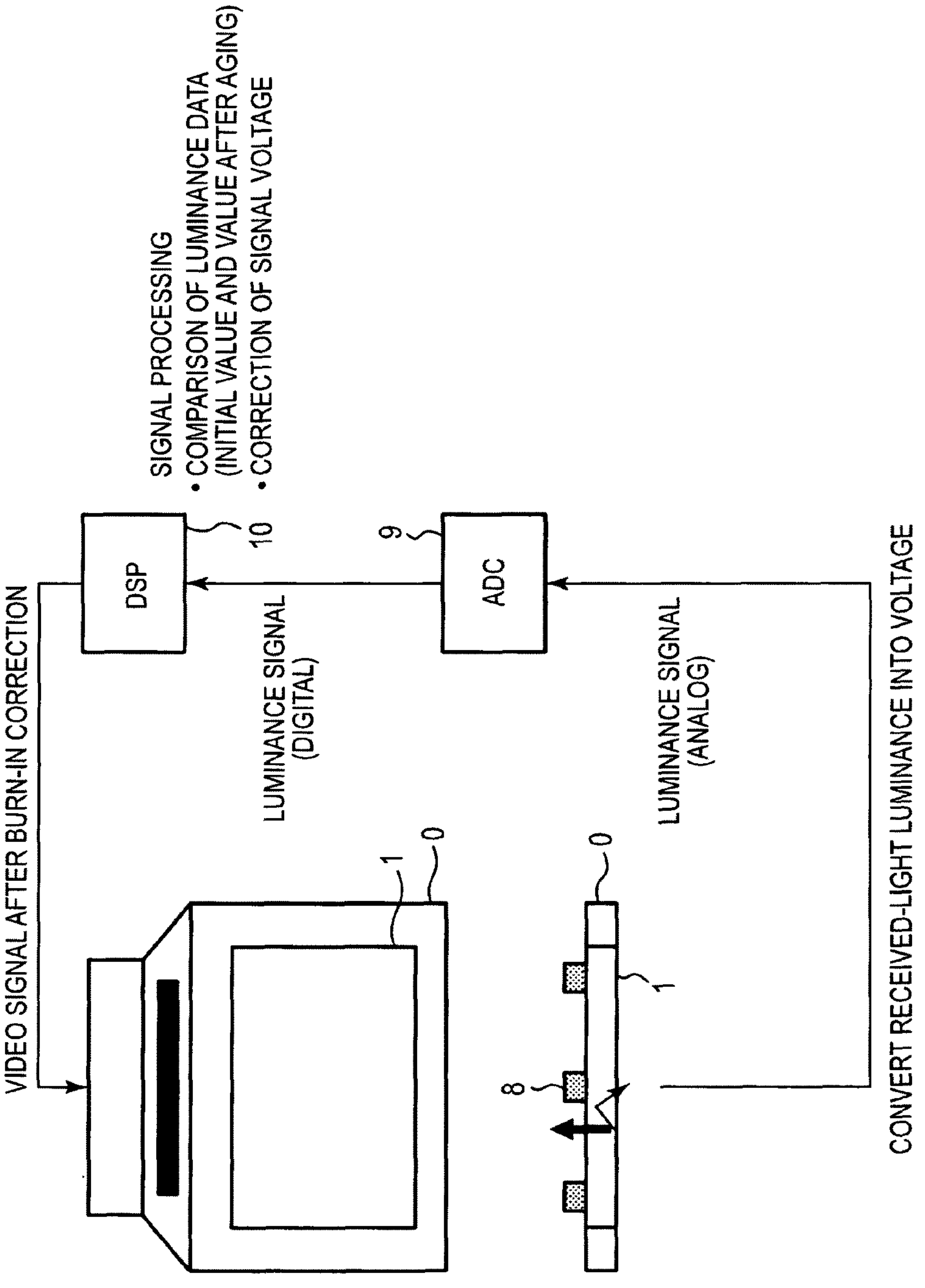
FIG. 6 is a block diagram also showing the whole configuration.

FIG. 6 is a block diagram showing a modification example of the display device according to the first embodiment shown in FIG. 5. In order to make understanding easier, corresponding reference numerals are given to portions corresponding to components shown in FIG. 5. A different point is that the light sensor 8 is arranged on the surface side, not on the reverse side of the panel "0". When the light sensor 8 is arranged on the surface side, there is an advantage that the light receiving amount is increased as compared with the case of the reverse side. However, when the light sensor 8 is arranged on the surface side of the panel "0", there occurs a disadvantage that light emission from part of pixels is sacrificed.

[Configuration of the Panel]

Figure 7:
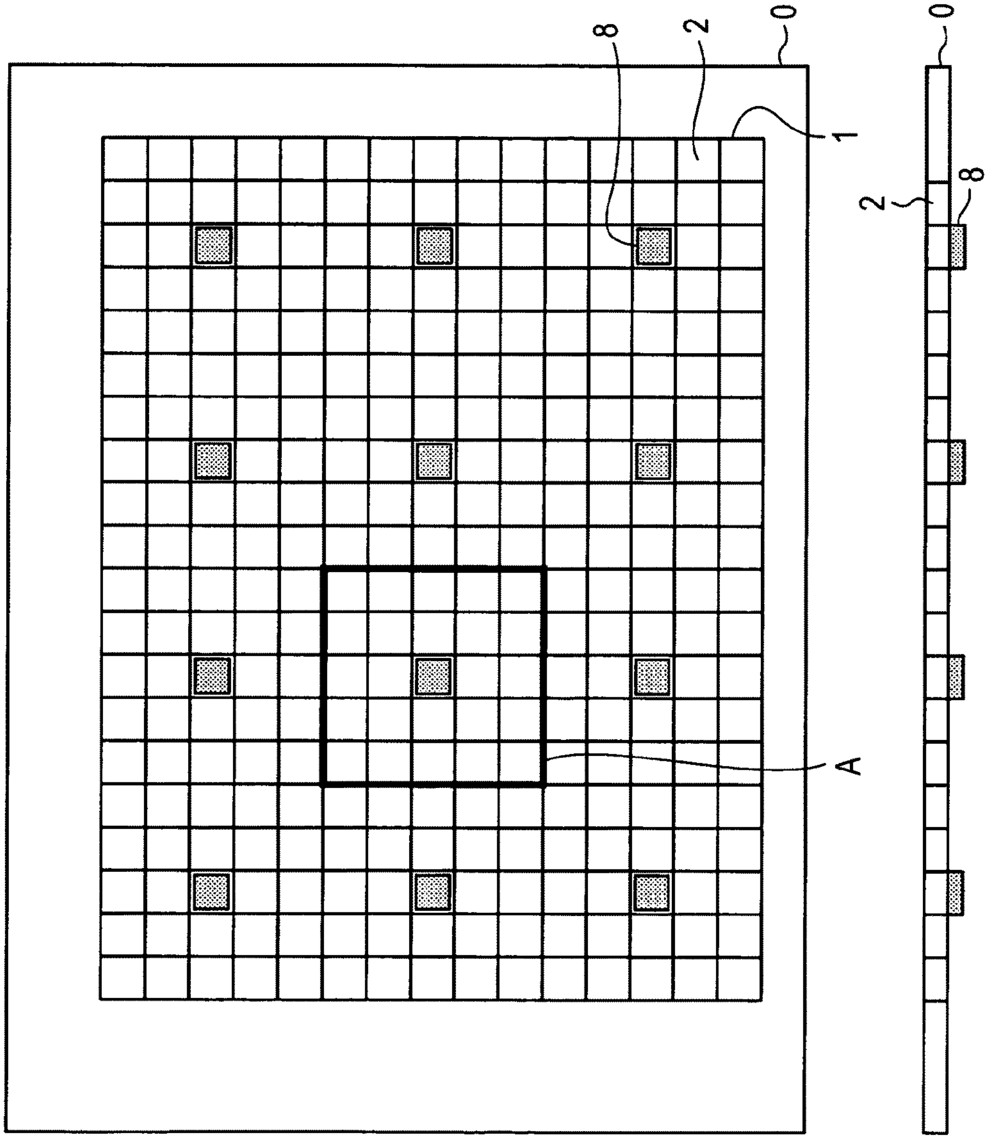
FIG. 7 shows a schematic plan view and a cross-sectional view of the panel.

FIG. 7 is a schematic plan view and a cross-sectional view showing a configuration of the panel included in the display device shown in FIG. 5. As shown in the drawing, the screen unit (pixel array unit) 1 is arranged at the center of the panel "0". The drive unit including the driver and scanner and the like is mounted at the periphery (frame portion) of the panel "0" surrounding the screen unit 1, though not shown. However, the invention is not limited to the above and the drive unit may be provided apart from the panel "0".

The screen unit 1 is sectioned into plural regions 1A. The light sensors 8 are arranged so as to correspond to respective regions A. The light sensor 8 detects light emitting luminance of pixels 2 belonging to a corresponding region A and supplies corresponding luminance signals to the signal processing unit (not shown).

In the shown example, the pixels are arranged in a matrix state of 15 rows and 20 columns. The pixel array is sectioned into twelve regions. Each region A includes twenty-five pixels 2 of 5 rows and 5 columns. One light sensor 1 is arranged with respect to twenty-five pixels 2. The necessary number of light sensors 8 can be drastically reduced as compared with the case in which one light sensor 8 is formed with respect to one pixel 2.

[Cross-Sectional Structure of the Panel]

Figure 8:
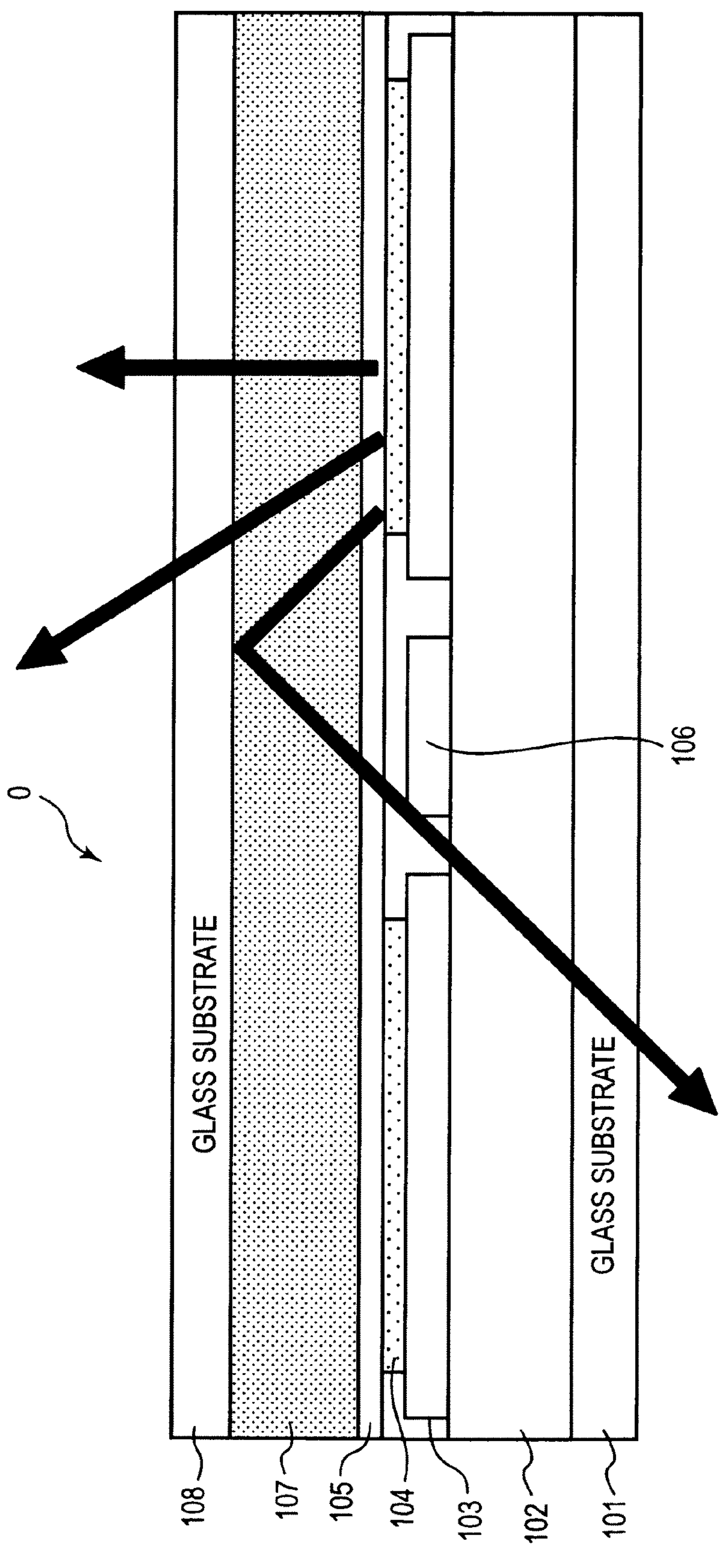
FIG. 8 is an enlarged cross-sectional view of a panel.

FIG. 8 shows a cross-sectional structure of the panel shown in FIG. 7. The panel "0" has a structure in which a lower glass substrate 101 and an upper glass substrate 108 are stacked. An integrated circuit 102 is formed over the glass substrate 101 by a TFT process. The integrated circuit 102 is an aggregation of pixel circuits shown in FIG. 2. On the integrated circuit 102, anodes 103 of the light emitting elements EL are formed separately in each pixel. Wirings 106 for connecting respective anodes 103 to the integrated circuit 102 side are also formed. A light emitting layer 104 made of an organic EL material and the like is formed over the anodes 103. A cathode 105 is formed over the whole surface further thereon. The cathode 105, the anode 103 and the light emitting layer 104 held between the both make a light emitting element. Over the cathode 105, the glass substrate 108 is bonded through a sealing layer 107.

The organic EL light-emitting element is a self-luminous device. Emitted light is mostly directed to the surface direction (direction of the upper glass substrate 108) of the panel "0". However, there are a light which is emitted obliquely and a light which is reflected and scattered repeatedly inside the panel "0" and penetrates to the reverse side (direction of the lower glass substrate 101) of the panel "0". In the example shown in FIG. 5, the light sensor is mounted on the reverse side of the panel "0", which detects emitted light penetrating from the light emitting element to the reverse side of the panel "0". In this case, not only light emission from the pixel just above the light sensor but also light emitting luminance of peripheral pixels shifted from the position just above the sensor can be also measured.

[Distribution of Received Light Amount by the Light Sensor]

Figure 9:
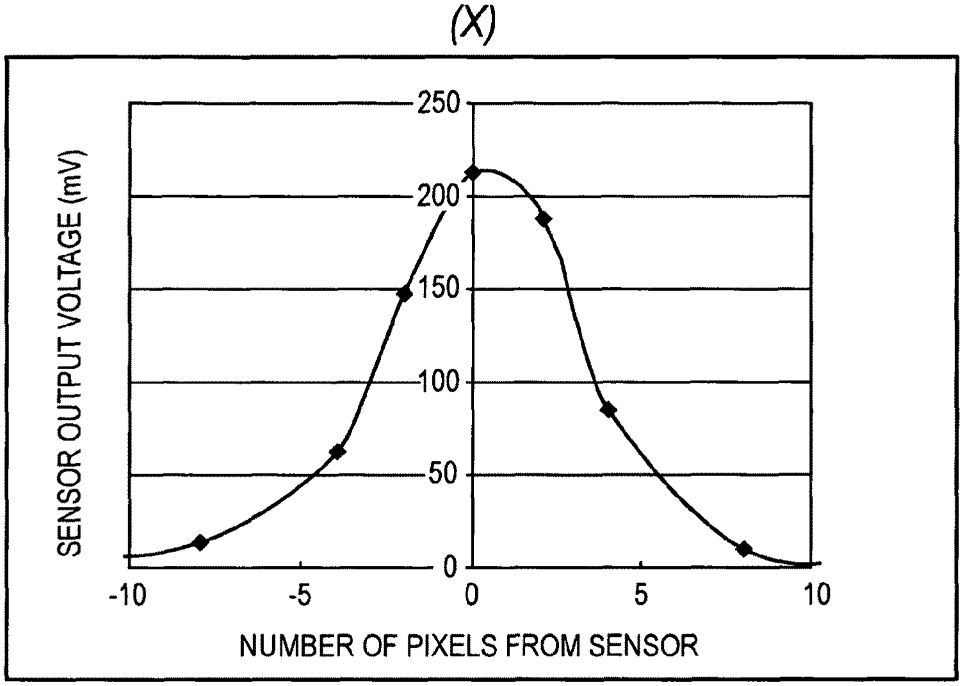
FIG. 9 shows graphs showing distributions of luminance signals outputted from the light sensor.
Figure 9:
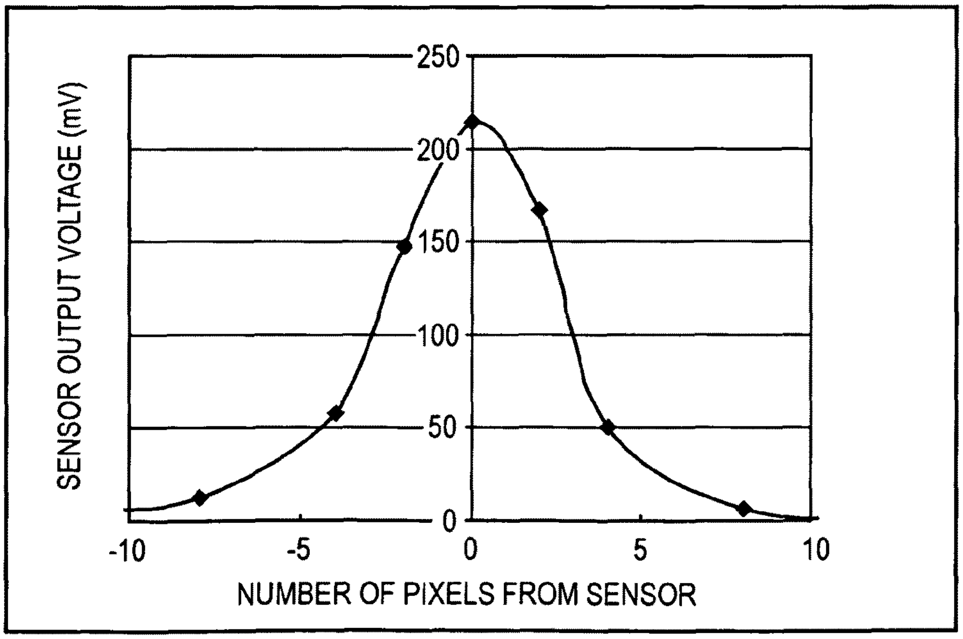

FIG. 9 shows graphs representing distribution of the amount of light received by the light sensor. (X) represents the distribution of received light in the row direction. A horizontal axis indicates the distance from the light sensor by the number of pixels and a vertical axis indicates the sensor output voltage. The sensor output voltage is in proportion to the amount of received light. As apparent from the graph, the light sensor receives not only light emission from the pixel positioned at the center (pixel positioned just above the sensor) but also light emission from pixels apart from the center to some degree and outputs corresponding luminance signals.

(Y) represents distribution of the amount of light received by the light sensor along the column direction. It is found that the light sensor receives not only light emission from the central pixel but also light emission from peripheral pixels to some degree in the column direction also in the same manner as the distribution of the amount of received light in the row direction shown in (X) and can output corresponding luminance signals.

In the embodiment of the invention, one light sensor is arranged with respect to plural pixels by utilizing the fact that the distribution of the amount of light received by the light sensor has some degree of width in the region. Accordingly, it is possible to reduce the number of light sensors and to drastically reduce costs in the burn-in correction system. Considering the distribution of the amount of light received by the light sensor (distribution of received light intensity) shown in FIG. 9, the range (region) measured by one light sensor is desirable to be the range in which distances to the light sensor are equal in all directions, up and down, left and right. In other words, it is desirable that the light sensor is arranged at the center of each sectioned region.

[Detection Operation of Light Emitting Luminance 1]

Figure 10A:
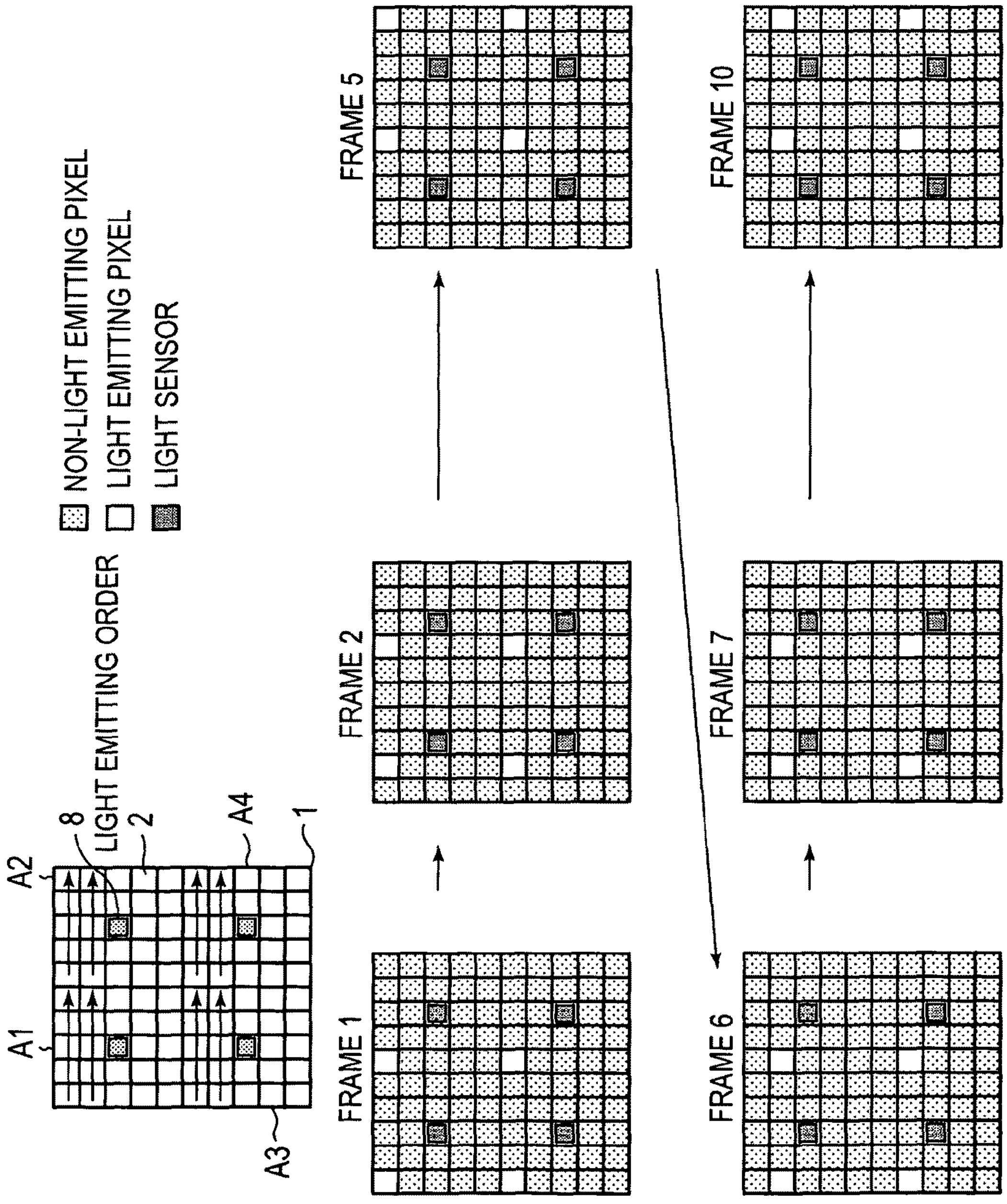
FIG. 10A is a schematic diagram for explaining operations of the first embodiment.

FIG. 10A is a schematic diagram showing a sequence of a detection operation of light emitting luminance. As shown in the upper left in the drawing, the screen unit 1 includes pixels 2 of 10 rows and 10 columns, which is sectioned into four regions from a region A1 to a region A4. Each region A includes pixels of 5 rows and 5 columns. The light sensor 8 is arranged at the center of each region A.

In a first frame 1, pixels at the upper left corner in pixels belonging to respective regions emit light at the same time. All the remaining pixels are in a light-out state. In other words, the video signal for detection is written in pixels positioned at the upper left corner in respective regions to allow the pixels to emit light in the frame 1, and a black-level signal is written in the remaining pixels to allow the pixels to be in the non-light emitting state. Accordingly, it is possible to allow pixels of detection targets to emit light at respective regions.

Emitted Lights from lit pixels are received by corresponding light sensors 8. At that time, emitted lights from pixels which emit light at adjacent regions at the same time are set so as not to be mixed together. In the shown example, emitted light of a pixel which emits light at an upper left corner of the region A1 is not substantially mixed with light emission of a pixel which emits light at an upper left corner of the region A2. Similarly, a lit pixel at the region A1 does not interfere with a pixel which emits light at the same time at the region A3. A lit pixel at the region A4 does not interfere with a lit pixel at the region A1.

When proceeding to a next frame 2, the display pattern is rewritten by the line-sequential scanning of the screen unit 1. Pixels in the second position from the upper left corner at respective regions A emit light. Lights from pixels simultaneously emitted at respective regions are received by corresponding light sensors 8 respectively, and corresponding luminance signals are outputted. Accordingly, respective pixels are lit in a dot-sequential manner in each region, and the light receiving operation proceeds. In a frame 5, pixels at the upper right corner in pixels belonging to respective regions emit light, and the remaining pixels are put into the light-out state. Accordingly, light emitting luminances of five pixels belonging to the first row at respective regions are detected in the dot-sequential manner in frames 1 to 5.

When proceeding to a next frame 6, pixels at the top of the second line at respective regions emit light and the remaining pixels are in the light-out state. After that, the operation proceeds to a frame 7 in the same manner, and the detection operation of pixels in the second line at respective regions is completed in a frame 10. Accordingly, light emitting luminances of pixels included in one screen can be detected in the total 25 frames. In the case of the display having 30 Hz frame frequency, the detection of light emitting luminances of all pixels is completed for one second or less.

As described above, the signal processing unit of the display device according to the embodiment of the invention supplies a normal video signal during a display period in which video is displayed in the screen unit 1, while the unit supplies a video signal for luminance detection to the screen unit 1 during a detection period included in a non-display period in which video is not displayed. The signal processing unit supplies the video signal for detection in each frame. The video signal for detection allows only pixels of detection targets to emit light and allows the remaining pixels to be in the non-light emitting state in one frame.

According to the embodiment of the invention, the pixels 2 in a range in which one light sensor can receive light are allowed to emit light pixel-by-pixel in the dot-sequential manner. Moreover, the light emission is performed with respect to plural light sensors 8 at the same time. Accordingly, the light emitting operations can be processed in parallel, which drastically reduces the luminance detection time. In the detection operation, pixels 2 the number of which are the same number as the light sensors 8 emit light at the same time in one panel "0", and the light emission is repeated by a dot-sequential drive.

The control of simultaneous light emission in plural pixels is performed by the video signal to be inputted to the panel. Operation timing of pixels is controlled by the line-sequential scanning by the scanner in the same manner as the normal display period. In order to prevent occurrence of measurement error, the black-level video signal is inputted to pixels other than pixels of measurement targets. According to the above operation, light-emitting luminance data of plural pixels can be obtained simultaneously as well as sequentially by the plural light sensors, which can drastically reduce the light receiving time. It is desirable that the detection of light emitting luminance is performed pixel-by-pixel. In the case of color display, each pixel includes a pixel emitting green light, a pixel emitting red light and a pixel emitting blue light. In this case, light emitting luminance is desirable to be detected pixel-by-pixel to prevent different color lights from being mixed together. Considering the light-receiving sensitivity of the light sensor, the region measured by one light sensor is desirable to be the range in which distances to the light sensor are equal in all directions, up and down, left and right.

[Detection Operation of Light Emitting Luminance 2]

Figure 10B:
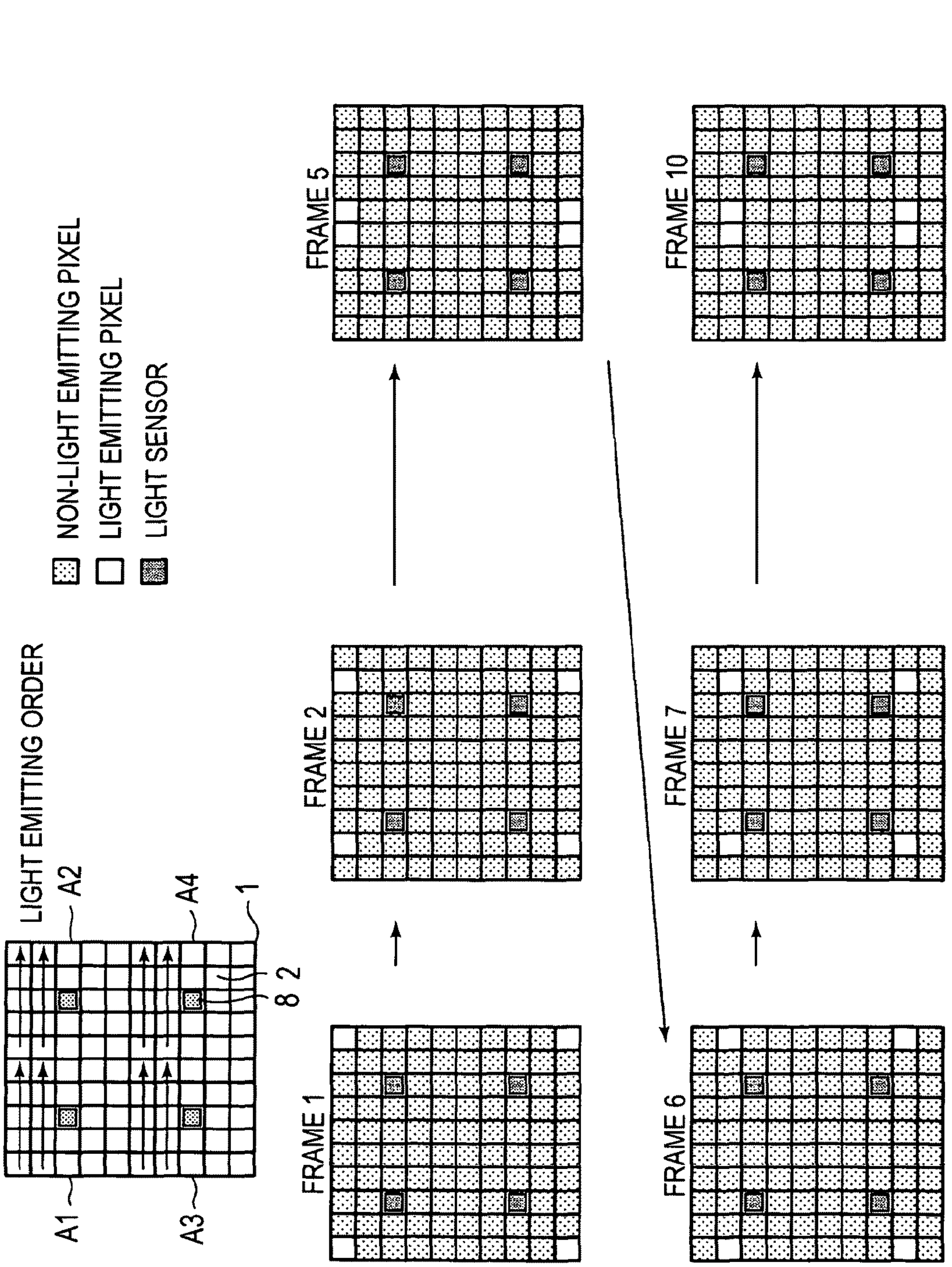
FIG. 10B is also a schematic diagram for explaining operations.

FIG. 10B is a schematic diagram showing another example of the light emitting sequence shown in FIG. 10A. In the example, pixels are lit at respective regions dot-sequentially in the same manner as the previous example shown in FIG. 10A. However, the example differs from the previous example in a point that moving directions of dot-sequential drive are reverse between adjacent regions. In the frame 1, pixels which emit light at adjacent regions are apart from each other at the farthest positions. In the frame 5, pixels which emit light simultaneously at adjacent regions in the row direction come close to each other again. In this case, in order to prevent lights emitted from adjacent pixels from being mixed together, light shielding walls may be provided along sections of respective regions. Subsequently, dot-sequential light emission of pixels proceeds frame-by-frame. In the last frame 25, four pixels closest to the center emit light simultaneously at four regions arranged in a square shape though not shown, and the light emitting luminances of all pixels included in the screen unit 1 are measured.

[Burn-in Phenomenon]

Figure 11:
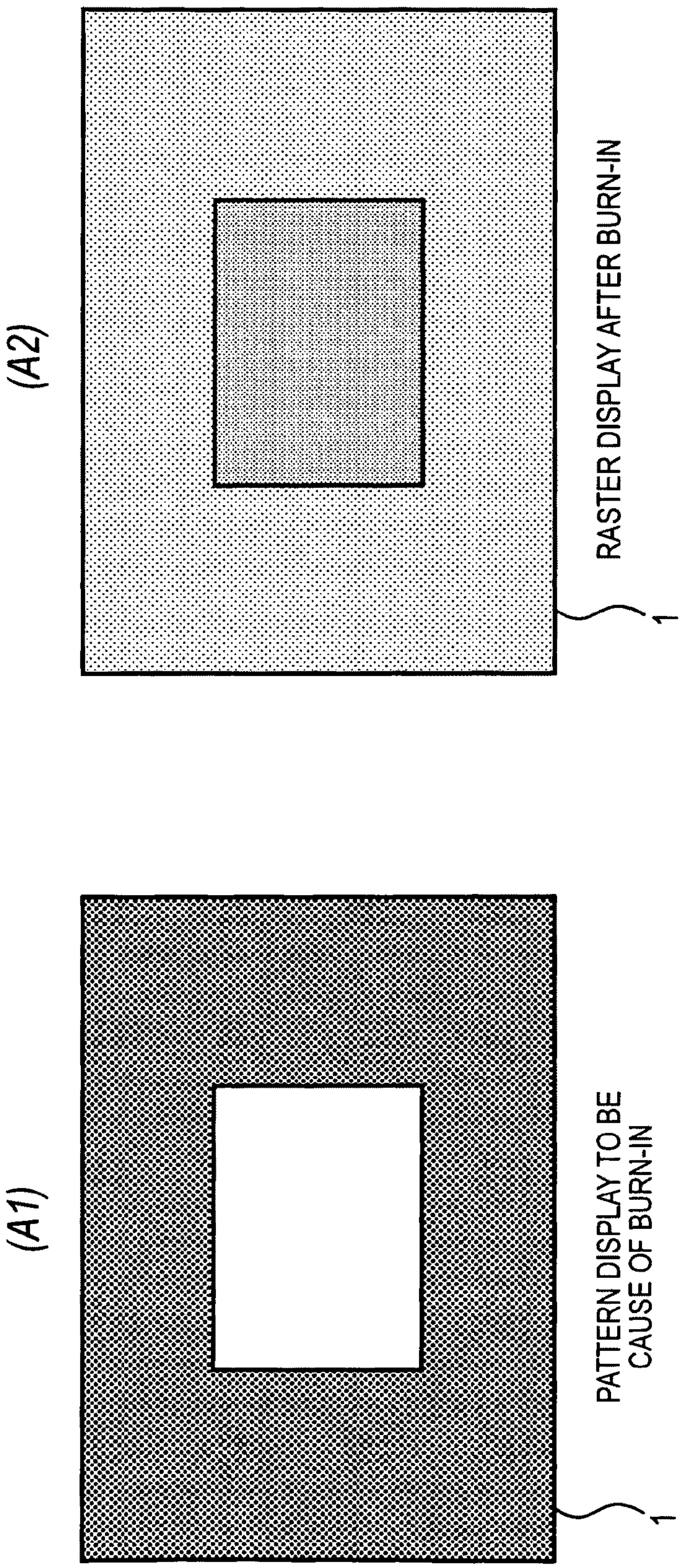
FIG. 11 is a schematic diagram showing a burn-in phenomenon.

FIG. 11 is a schematic view explaining "burn-in" as a processing target of the embodiment of the invention. (A1) represents a pattern display to be a cause of burn-in. For example, a window as shown in the drawing is displayed in the screen unit 1. Pixels in a portion of a white window continue emitting light at high luminance, while pixels in a peripheral black frame portion are put into the non-light emitting state. When this window pattern is displayed over a long period of time, luminance deterioration of pixels of the white portion proceeds, while luminance deterioration of pixels in the black frame portion proceeds relatively slowly.

(A2) represent a state in which the window pattern display shown in (A1) is deleted and an all-over raster display is performed in the screen unit 1. If there is no partial deterioration, luminance distribution which is uniform in the whole screen can be obtained when performing the raster display in the screen unit 1. However, luminance deterioration of pixels at the central portion previously displayed in white proceeds in fact, therefore, luminance at the central portion becomes lower than luminance of the peripheral portion, and "burn-in" appears as shown in the drawing.

[Burn-in Correction Processing]

Figure 12:
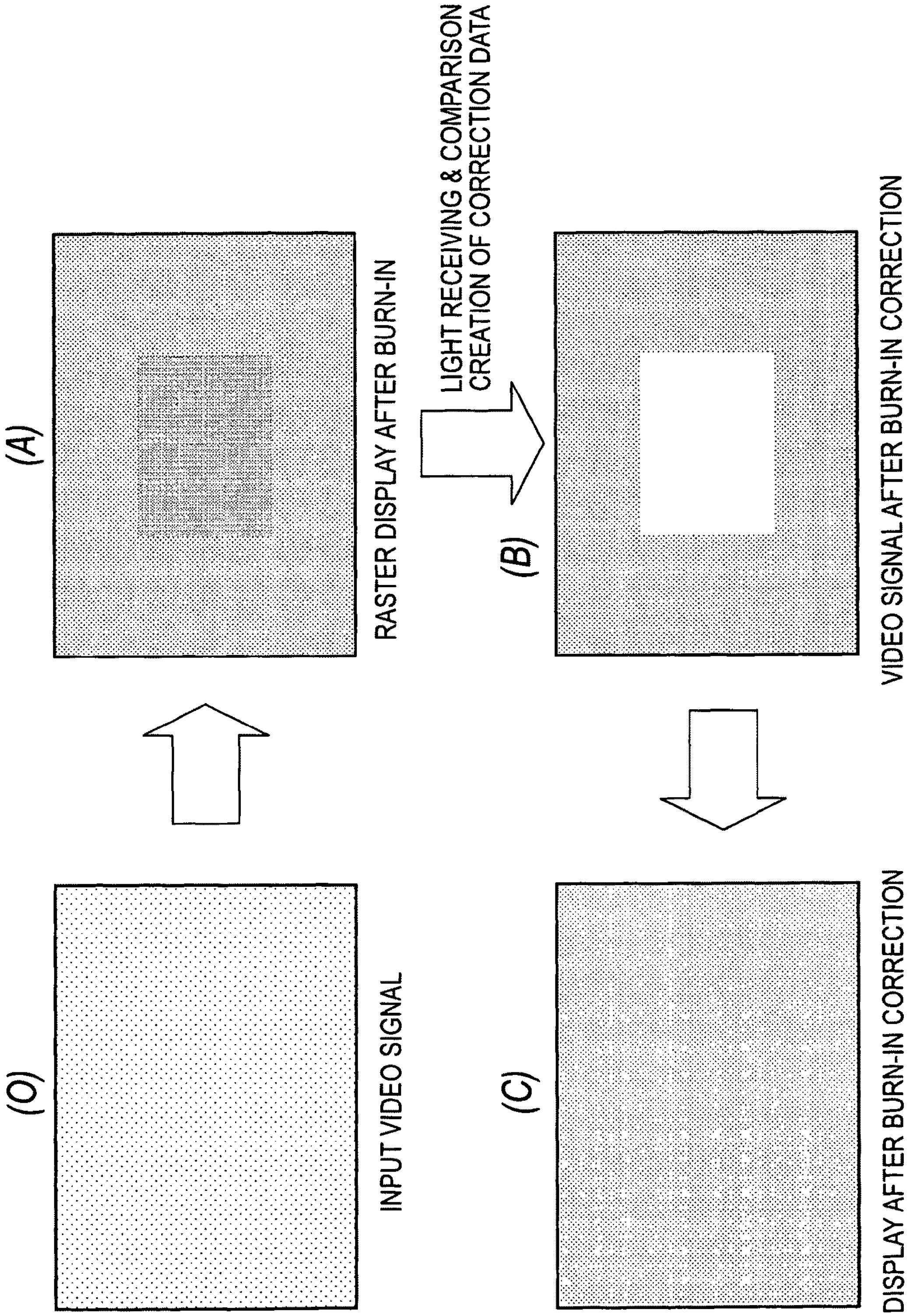
FIG. 12 is a schematic diagram showing correction processing of a video signal.

FIG. 12 is a schematic view showing a correction operation of "burn-in" shown in FIG. 11. (O) represents a video signal inputted to the signal processing unit of the display device from the outside. In the example, an all-over video signal is shown.

(A) represents luminance distribution when the video signal shown in (O) is displayed in the screen unit where "burn-in" as shown in FIG. 11 has already occurred. Even when the all-over video signal is inputted, there exists a partial burn-in in the screen unit of the panel, therefore, luminance of a window portion at the center is darker than a peripheral frame portion.

(B) represents a video signal obtained by correcting the video signal (O) inputted from the outside in accordance with the detection result of light emitting luminances of respective pixels. In the video signal after the burn-in correction shown in (B), the level of the video signal to be written in pixels at the central window portion is corrected to be relatively higher and the level of the video signal to be written in pixels at the peripheral frame portion is corrected to be relatively lower. As described above, the correction is performed so that the video signal has positive luminance distribution shown in (B) for cancelling negative luminance distribution due to burn-in shown in (A).

(C) schematically represents a state in which the video signal after the burn-in correction is displayed in the screen unit. Nonuniform luminance distribution due to burn-in remaining in the screen unit of the panel is compensated by the video signal for burn-in correction and the screen having uniform luminance distribution can be obtained.

[Specific Configuration of First Embodiment]

Figure 13A:
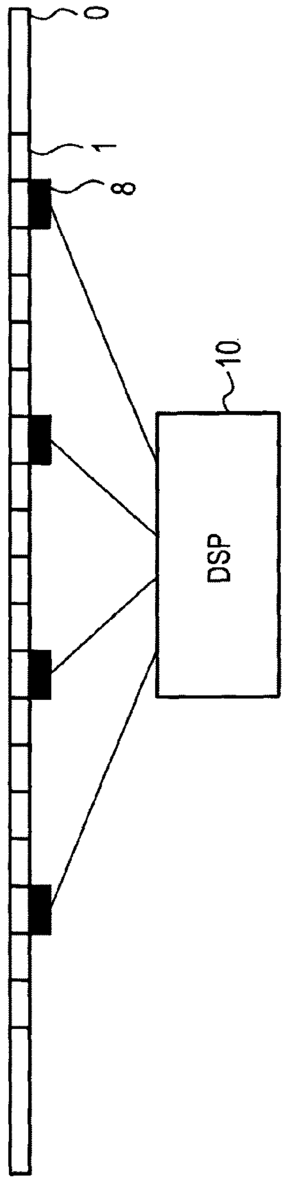
FIGS. 13A and 13B are schematic diagrams showing a configuration of the first embodiment.
Figure 13B:
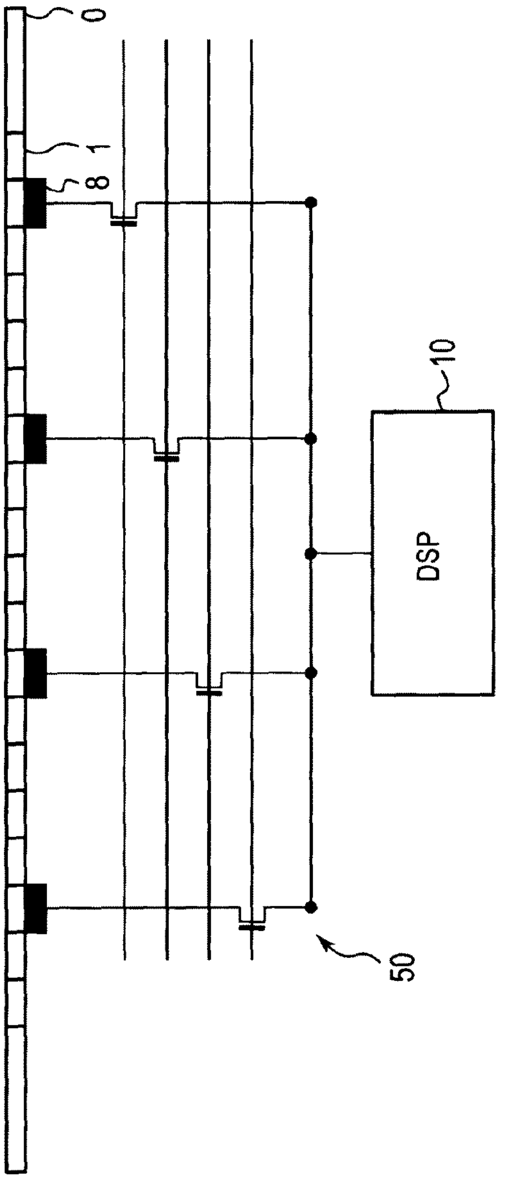

FIGS. 13A and 13B are schematic diagrams representing specific configurations of a display device according to the first embodiment of the invention. FIG. 13A is a reference example cited for comparison, which represents parallel drive of plural sensors. As shown in the drawing, the screen unit 1 (pixel array unit) 1 is formed in the panel "0". The screen unit 1 is sectioned into plural regions. On the reverse side of the panel "0", plural light sensors 8 are arranged so as to correspond to plural regions. The plural light sensors 8 are driven in parallel in one frame. The plural light sensors are connected to the signal processing unit (DSP) 10 through wirings respectively. The DSP 10 includes, for example, an ASIC chip, in which connection pins are necessary for the number of plural light sensors 8. However, when the number of light sensors 8 is increased, the number of pins is not actually sufficient in a general-purpose ASIC chip and it is difficult to respond to the connection.

FIG. 13B represents a specific example of the first embodiment, which shows a phase shift parallel drive system by plural sensors. In order to make understanding easier, corresponding reference numerals are given to portions corresponding to the reference example shown in FIG. 13A. As shown in the drawing, the screen unit 1 of the panel "0" is sectioned into plural regions, and light sensors 8 are arranged so as to correspond to respective regions. Each light sensor 8 detects light emitting luminances of pixels belonging to a corresponding region and outputs corresponding luminance signals. As a feature matter of the embodiment of the invention, a selector 50 is interposed between the light sensors 8 and the DSP 10. The selector 50 supplies luminance signals outputted from plural light sensors 8 arranged so as to correspond to plural regions to the signal processing unit (DSP) 10 by switching the signals. The number of terminals for external connection of the DSP 10 can be reduced as compared with the reference example by interposing the selector 50 in this manner. Accordingly, the general-purpose ASIC chip can be used as the DSP 10 according to the embodiment of the invention.

In the simple parallel drive system shown in FIG. 13A, the number of luminance signals outputted from the panel "0" side is increased. Therefore, the number of input pins of the DSP 10 is increased in proportion to the number of sensors. On the other hand, in the phase shift parallel drive system by plural sensors shown in FIG. 13B, the number of input pins of the DSP 10 can be reduced by interposing the selector 50. Accordingly, connection processing between the panel "0" and the DSP 10 can be simplified.

As described above, the light sensor 8 outputs luminance signals in each frame. The time order in one frame is normally "ms". On the other hand, the operation speed of the IC included in the DSP 10 is "ns" or "μs". The processing operation of the DSP 10 is much faster than the light receiving operation of the light sensor 8. In the embodiment of the invention, luminance signals outputted from plural light sensors 8 during one frame are inputted to the DSP 10 side by sampling the signals sequentially by the selector 50 by using the above in the embodiment. In other words, the selector 50 reduces the number of input pins of the DSP 10 as well as utilizes processing ability of the DSP 10 efficiently by performing parallel/serial conversion of signals.

[Timing Chart]

Figure 14A:
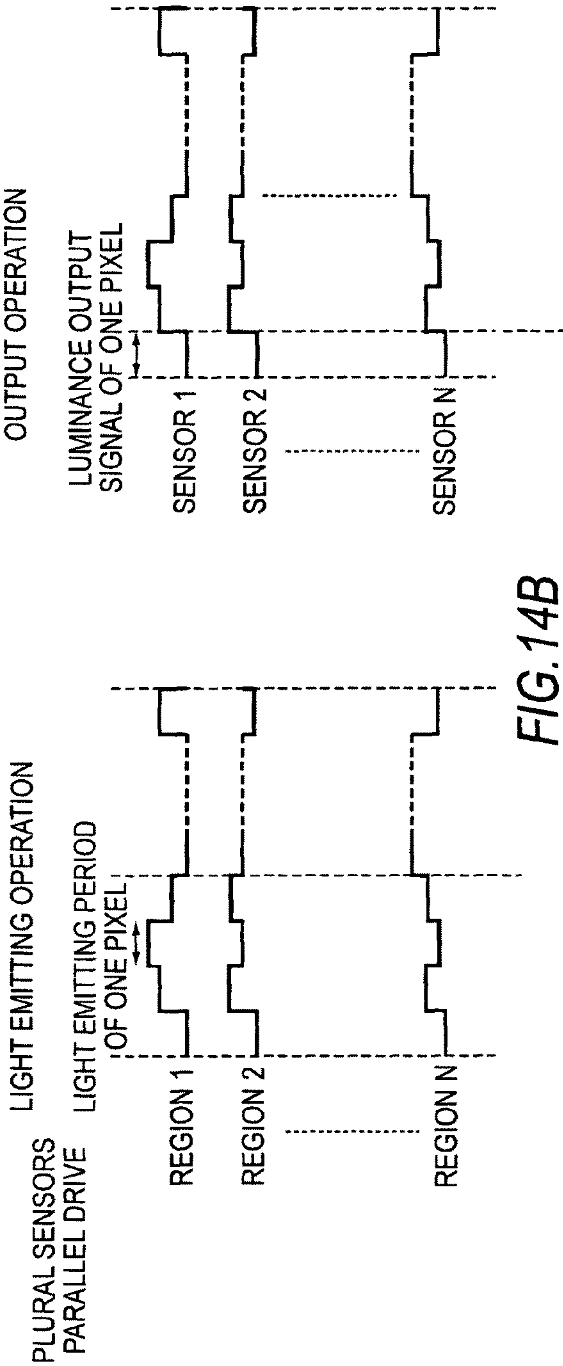
FIGS. 14A and 14B show timing charts for explaining operations also of the first embodiment.
Figure 14B:
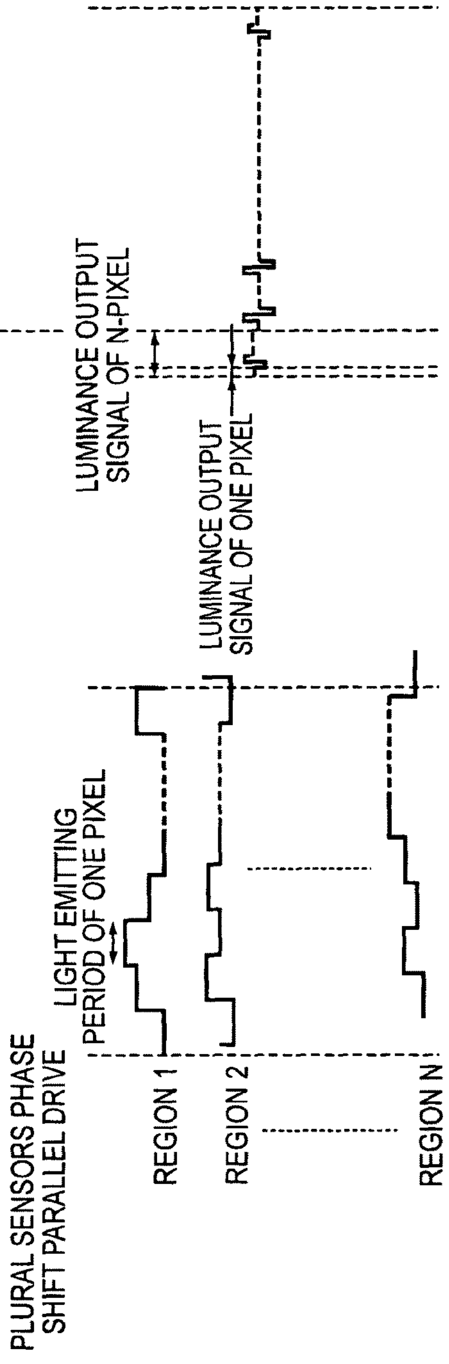

FIGS. 14A and 14B show timing charts for explaining operations of the reference example and the embodiment shown in FIGS. 13A and 13B. In the reference example of the parallel drive of plural sensors shown in FIG. 14A, pixels belonging to plural regions 1 to N emit light simultaneously in one frame. In the timing chart representing the light emitting operation, the light emitting period of one pixel corresponds to one frame.

On the other hand, light sensors 1 to N arranged so as to correspond to respective regions 1 to N receive light emitting luminances of pixels of corresponding regions in parallel, outputting the result as luminance signals. As shown in the timing chart of the output signals, luminance output signals from one pixel are simultaneously outputted from all sensors 1 to N in one frame and supplied to the DSP side. Accordingly, in the parallel drive of plural sensors of the reference example, the light emitting operation and the signal output operation are performed in each frame.

On the other hand, in the phase shift parallel drive of plural sensors shown in FIG. 14B, pixels of detection targets in the plural regions 1 to N perform the light emitting operation while shifting the phase. The light emitting period of one pixel corresponds to one frame in the same manner as the reference example shown in FIG. 14A, however, the phase is shifted in the regions 1 to N. However, the invention is not limited to this, and it is not necessary to shift the phase of the light emitting operation in the regions 1 to N. It is also preferable that the light emitting operation is performed in all regions 1 to N at the same time as shown in FIG. 14A. On the other hand, the light sensor side receives light emission of respective pixels and outputs corresponding luminance signals. The selector samples and serializes the luminance signals sequentially, then, supplies them to the DSP side. In the shown example, the luminance output signals of N-pixels are compressed in one frame period by sampling, which can increase the speed of signal processing.

Figure 15A:
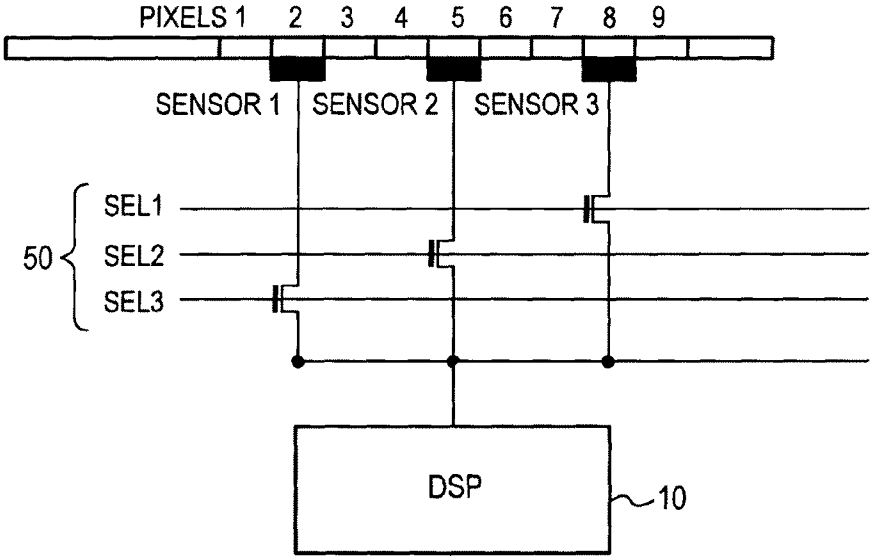
FIGS. 15A and 15B show schematic diagrams also for explaining the first embodiment.
Figure 15B:
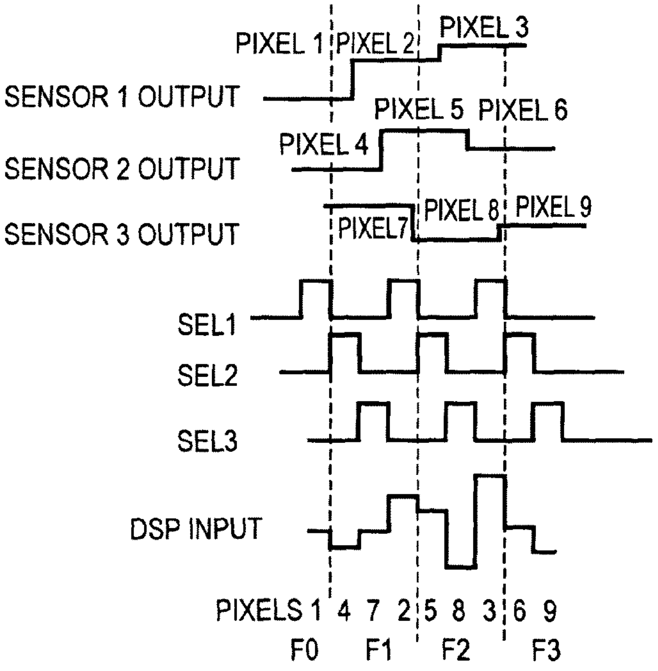

FIGS. 15A and 15B show schematic diagrams for explaining further detailed configuration and operations of the embodiment shown in FIGS. 13A and 13B. As shown in FIG. 13A, the selector 50 includes switching transistors inserted between respective sensors and the common input pins of the DSP 10. To the switching transistors, selection signals SEL1, SEL2, and SEL3 are sequentially supplied from a control unit (not shown) of the selector 50.

As shown in FIG. 15B, the sensor 1 detects light emission of a pixel 1 and output a corresponding luminance signal in a frame F0. In a next frame F1, the sensor 1 outputs a luminance signal of a pixel 2, the sensor 2 outputs a luminance signal of a pixel 4 and the sensor 3 outputs a luminance signal of a pixel 7. In a next frame F2, the sensor 1 outputs a luminance signal of a pixel 3, the sensor 2 outputs a luminance signal of a pixel 5 and the sensor 3 outputs a luminance signal of a pixel 8. In a next frame F3, the sensor 2 outputs a luminance signal of a pixel 6 and the sensor 3 outputs a luminance signal of a pixel 9.

On the other hand, the selector 50 outputs the selection signals SEL2, SEL3 and SEL 1 sequentially in each frame F, turning on corresponding switching transistors, sampling luminance signals from corresponding sensors and inputs the signals to the DSP. In the frame F0, the luminance signal of the pixel 1 is sampled and inputted to the DSP 10. In the next frame F1, luminance signals of the pixel 4, the pixel 7 and the pixel 2 are sequentially sampled and inputted to the DSP 10. Accordingly, the selector 50 inputs parallel luminance signals outputted from plural sensors by converting the signals into serial signals.

Second Embodiment

[Configuration]

Figure 16:
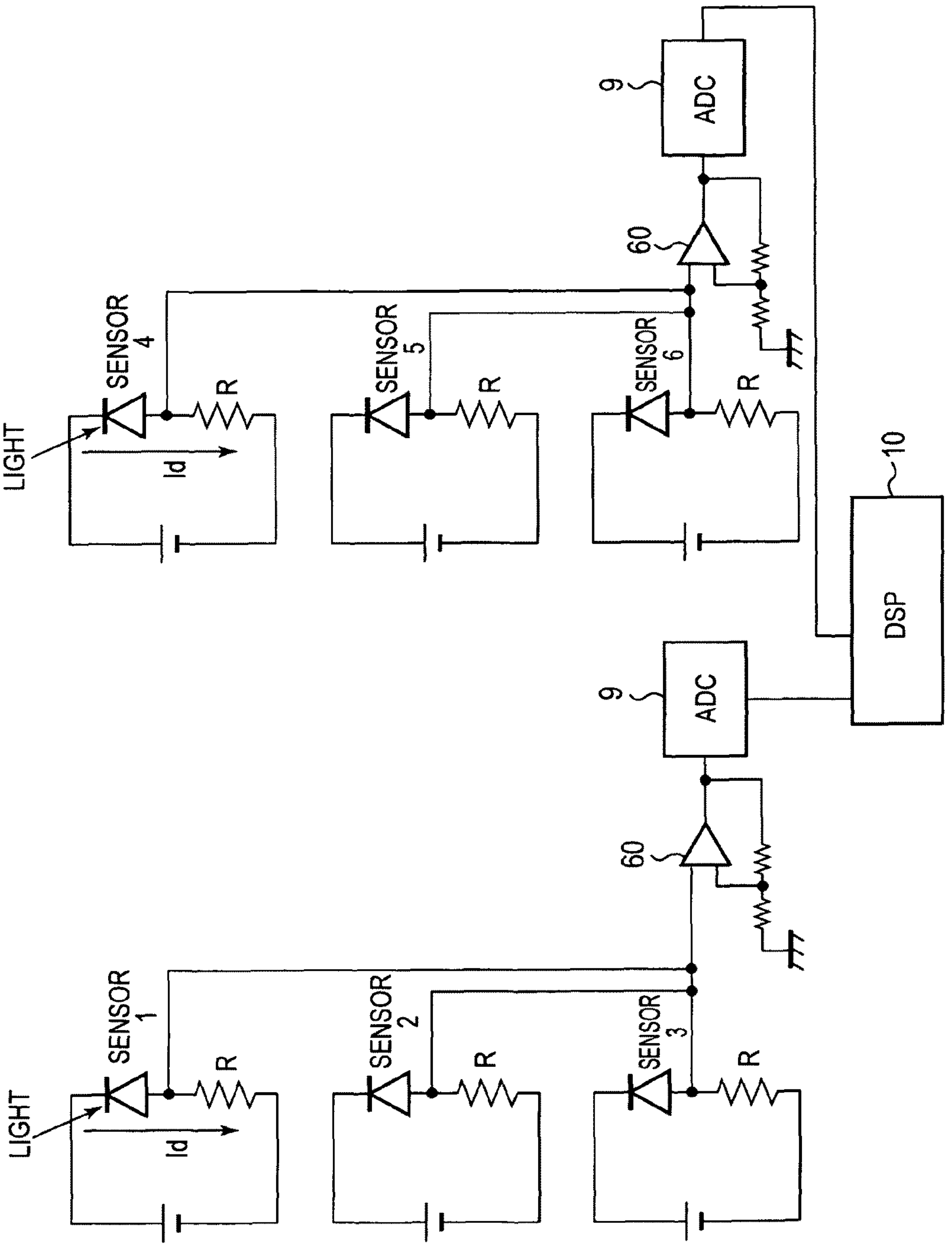
FIG. 16 is a block diagram showing a second embodiment.

FIG. 16 is a schematic block diagram showing a second embodiment. A display device according to the second embodiment basically includes a screen unit, a drive unit and a signal processing unit (DSP) 10. The screen unit (not shown) has a panel including rows of scanning lines, columns of signal lines, matrix-state pixels arranged at portions where respective scanning lines and respective signal lines intersect and a light sensor. The drive unit (not shown) includes a scanner sequentially supplying a control signal to respective scanning lines and a driver supplying a video signal to respective signal lines. The pixel (not shown) takes a video signal from the signal line as well as emits light in accordance with the taken video signal when selected in accordance with the control signal supplied from the scanning line. The light sensor detects light emitting luminance of each pixel and outputs a corresponding luminance signal. The signal processing unit 10 corrects the video signal in accordance with the luminance signal outputted from the light sensor as well as supplies the corrected video signal to the driver in the drive unit.

As a feature matter, the panel is sectioned into plural regions in the screen unit, and light sensors are arranged so as to correspond to respective regions. In the shown example, six light sensors are arranged on the panel, which are sensors 1 to 6. Respective sensors 1 to 6 detect light emitting luminances of pixels belonging to corresponding regions and output corresponding luminance signals. The plural sensors 1 to 6 are grouped into blocks by the given number of sensors. In the example, three sensors which are sensors 1 to 3 are schematically grouped to make one block. Similarly, three sensors which are sensors 4 to 6 are grouped into one block. The signal processing unit 10 receives luminance signals by each block alternately and processes the signals.

The embodiment includes an amplifier 60 which amplifies luminance signals outputted from respective light sensors 1 to 6 and supplied the signals to the signal processing unit 10. The amplifier 60 is arranged so as to correspond to each block. In other words, the amplifier 60 is shared by three sensors 1 to 3 included in one block.

Furthermore, the embodiment further includes a converter (ADC) 9 which converts an analog luminance signal outputted from the light sensor into a digital luminance signal and supplies the signal into the signal processing unit 10. The converter 9 is arranged so as to correspond to each block. In other words, the converter (ADC) 9 is shared by three sensors 1 to 3 belonging to one block.

The range in which light can be received includes, for example, several hundred pixels. When the number of pixels in the screen unit is approximately one million, several-thousand sensors will be necessary for measuring light emitting luminances of all pixels included in the screen. These sensor outputs are amplified by the amplifiers, then, digitally converted and inputted to the signal processing unit (DSP) 10 including a FPGA and the like. Accordingly, several-thousand amplifiers and several-thousand analog/digital converters will be also necessary, and several-thousand input pins of a FPGA chip will be further necessary. However, it is difficult that a general-purpose FPGA satisfies the use of such large number of input pins.

In the embodiment, plural light sensors are grouped into blocks by the given number of sensors. The signal processing unit receives luminance signals by each block. For example, several thousand sensors are divided into several dozen blocks having approximately one hundred sensors each. The correction operation by the signal processing unit is performed in each block sequentially. Accordingly, the amplifier and the analog/digital converter can be shared in each block. The number of amplifiers and converters can be the same as the number of blocks. At the same time, the number of input pins of the FPGA can be the same as the number blocks.

[Reference Example]

Figure 17:
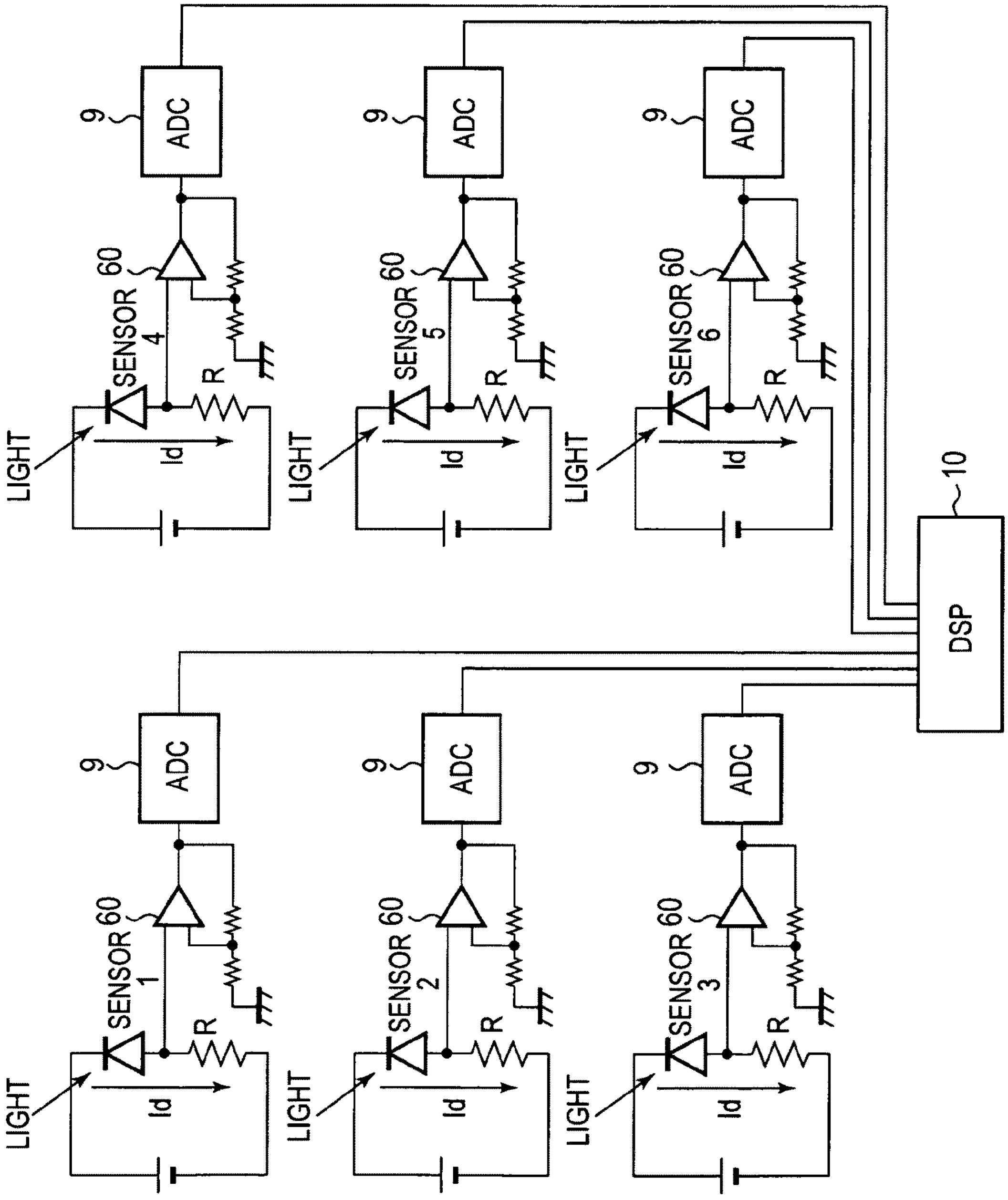
FIG. 17 is a block diagram showing a reference example.

FIG. 17 represents a reference example to be compared with the second embodiment shown in FIG. 16. In order to make understanding easier, corresponding reference numerals are given to portions corresponding to the second embodiment shown in FIG. 16. In the shown reference example, the amplifier 60 and the analog/digital converter (ADC) 9 are provided so as to correspond to each light sensor. Therefore, when there are six light sensors as in the drawing, six amplifiers 60 will be necessary. Also, six ADCs 9 will be necessary. The reference example shown in FIG. 17 is simplified for making the drawing simple, however, when the example is applied to the panel in which several thousand light sensors are incorporated, the same number of amplifiers and ADCs will be necessary, which is not practical.

Third Embodiment

Figure 18:
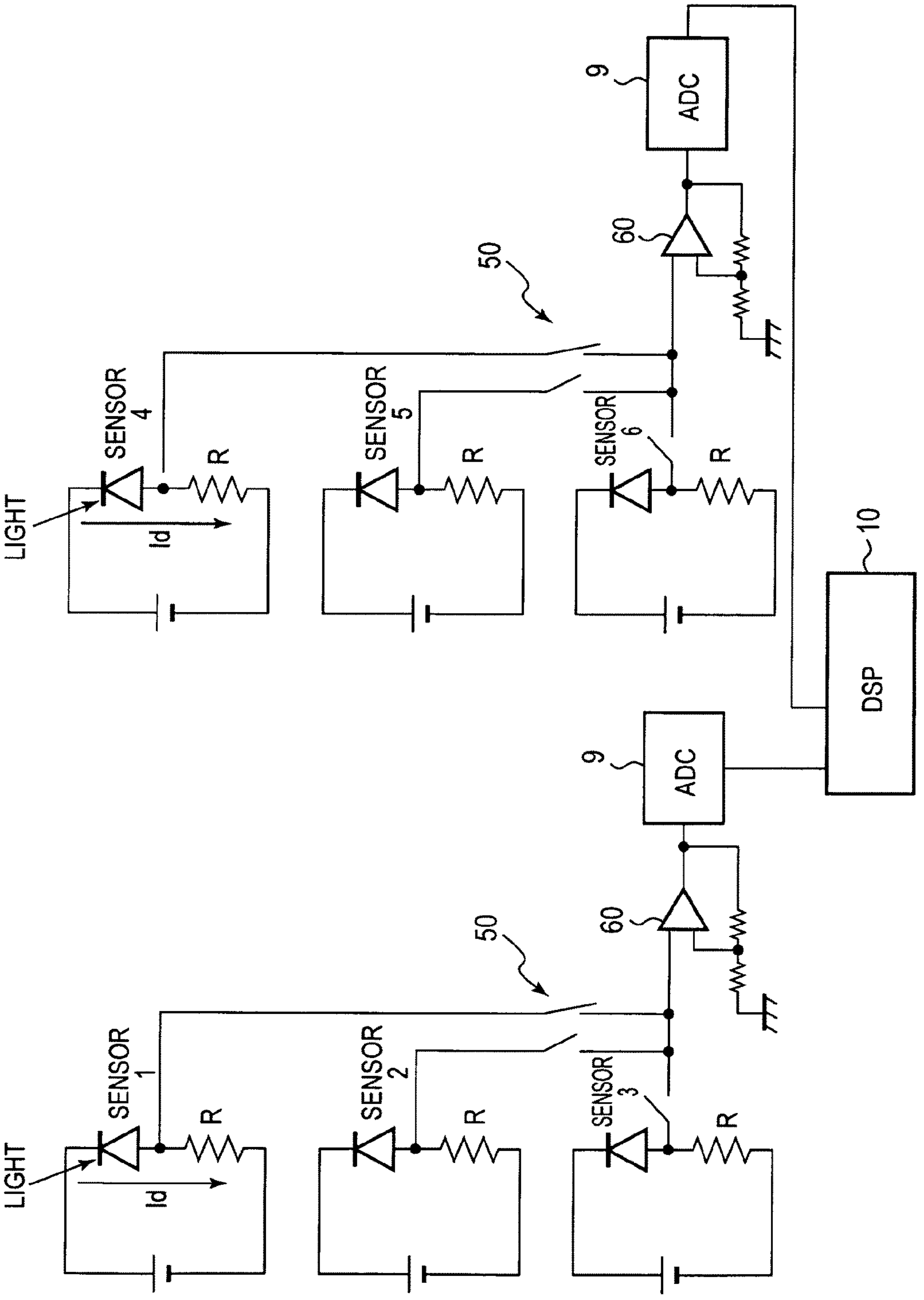
FIG. 18 is a block diagram showing a third embodiment.

FIG. 18 is a schematic block diagram showing a display device according to a third embodiment of the invention. Corresponding reference numbers are given to portions corresponding to the second embodiment shown in FIG. 16. A different point is that the selector 50 is inserted between plural sensors and the amplifier 60 in each block. For example, when focusing attention to a first block, luminance signals outputted in parallel from three sensors 1 to 3 are serialized in the selector 50 and inputted to the amplifier 60. In this manner, the amplifier 60 can be shared by the sensors 1 to 3.

Fourth Embodiment

Figure 19:
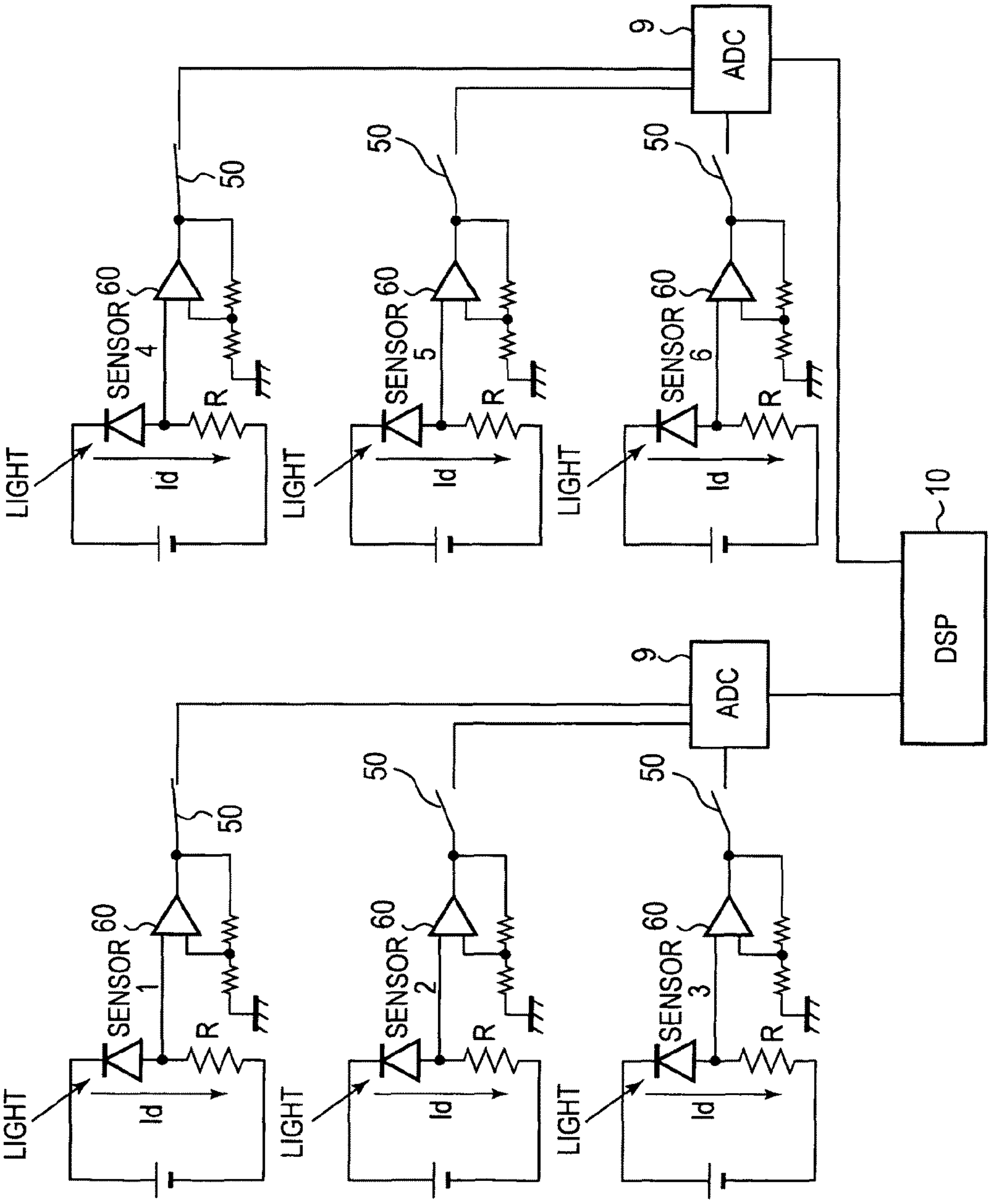
FIG. 19 is a block diagram showing a fourth embodiment.

FIG. 19 is a block diagram showing a display device according to a fourth embodiment of the invention. Corresponding reference numerals are given to portions corresponding to the third embodiment shown in FIG. 18 to make understanding easier. In the embodiment, the selector 50 is inserted between the amplifier 60 arranged corresponding to each light sensor and the ADC 9. Accordingly, the ADC 9 can be shared by the plural light sensors in each block. However, the amplifier 60 is provided so as to correspond to each sensor.

Fifth Embodiment

Figure 20:
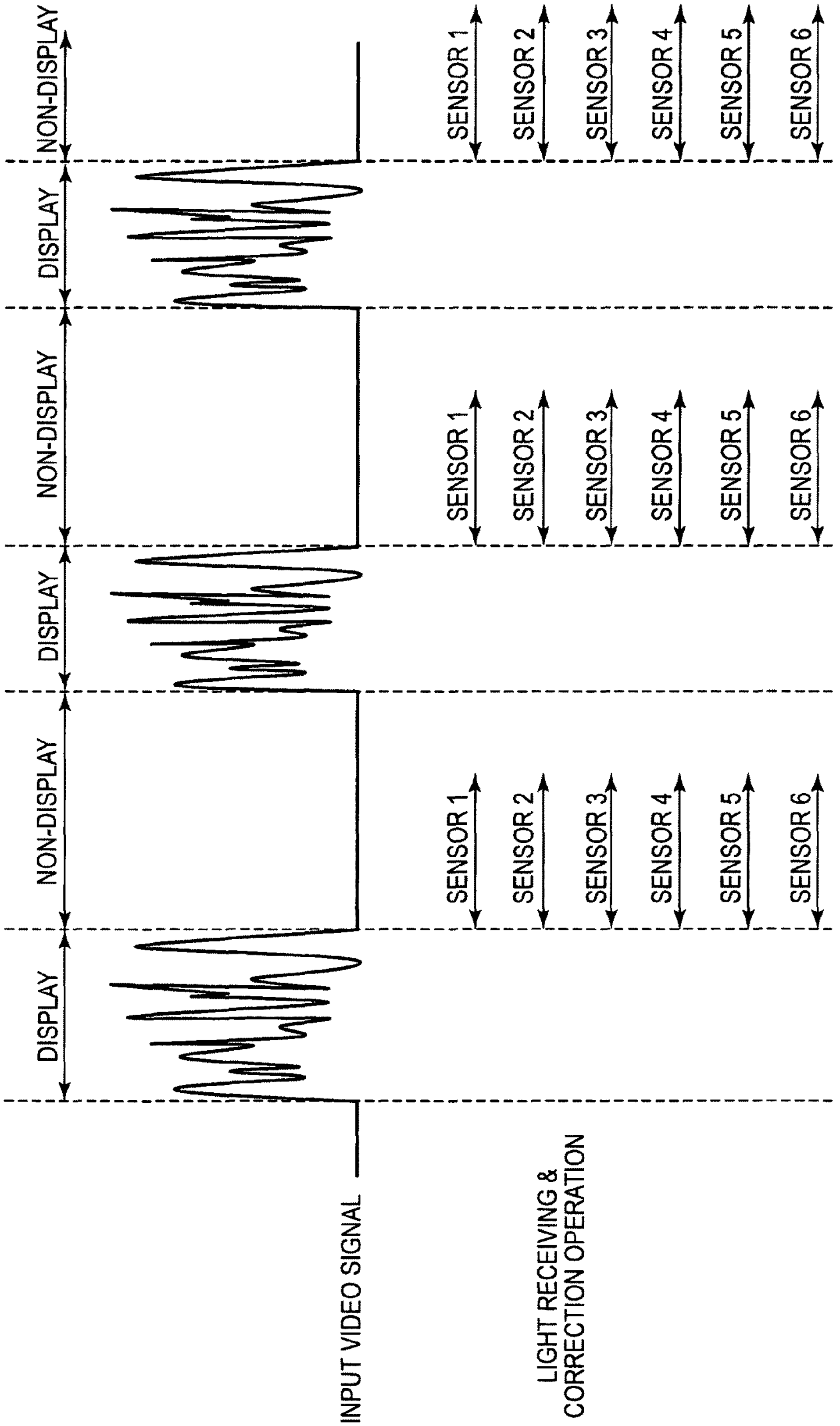
FIG. 20 is a timing chart showing a fifth embodiment.

FIG. 20 is a schematic timing chart of a display device according to a fifth embodiment of the invention. The signal processing unit supplies a normal video signal during a display period in which video is displayed in the screen unit and supplies a video signal for luminance detection during a detection period included in a non-display period in which video is not displayed. In the video signal for luminance detection, a given-level video signal is supplied to only pixels of measurement targets in each frame, while a black-level video signal is supplied to the remaining pixels. Accordingly, plural sensors 1 to 6 can detect light emitting luminances of all pixels included in the screen unit during the non-display period and can supply corresponding luminance signals to the signal processing unit side. The signal processing unit calculates a reduction amount of light emitting luminance by comparing a first luminance signal outputted from the light sensor at an initial stage with a luminance signal outputted from the light sensor after a given time has passed. Further, the video signal is corrected so as to compensate the calculated reduction amount of light emitting luminance to improve "burn-in".

As described above, the burn-in correction is performed in a stage when a certain period of time has passed after the start of using the panel. The correction operation after the certain period of time has passed is performed by using a time slot when the normal video signal is not inputted to the panel. For example, the time slot is a period when the device does not operate as a monitor. In the case of a notebook personal computer or a cellular phone, a time slot in which a cover is closed may be preferable.

Sixth Embodiment

[Panel Configuration]

Figure 21:
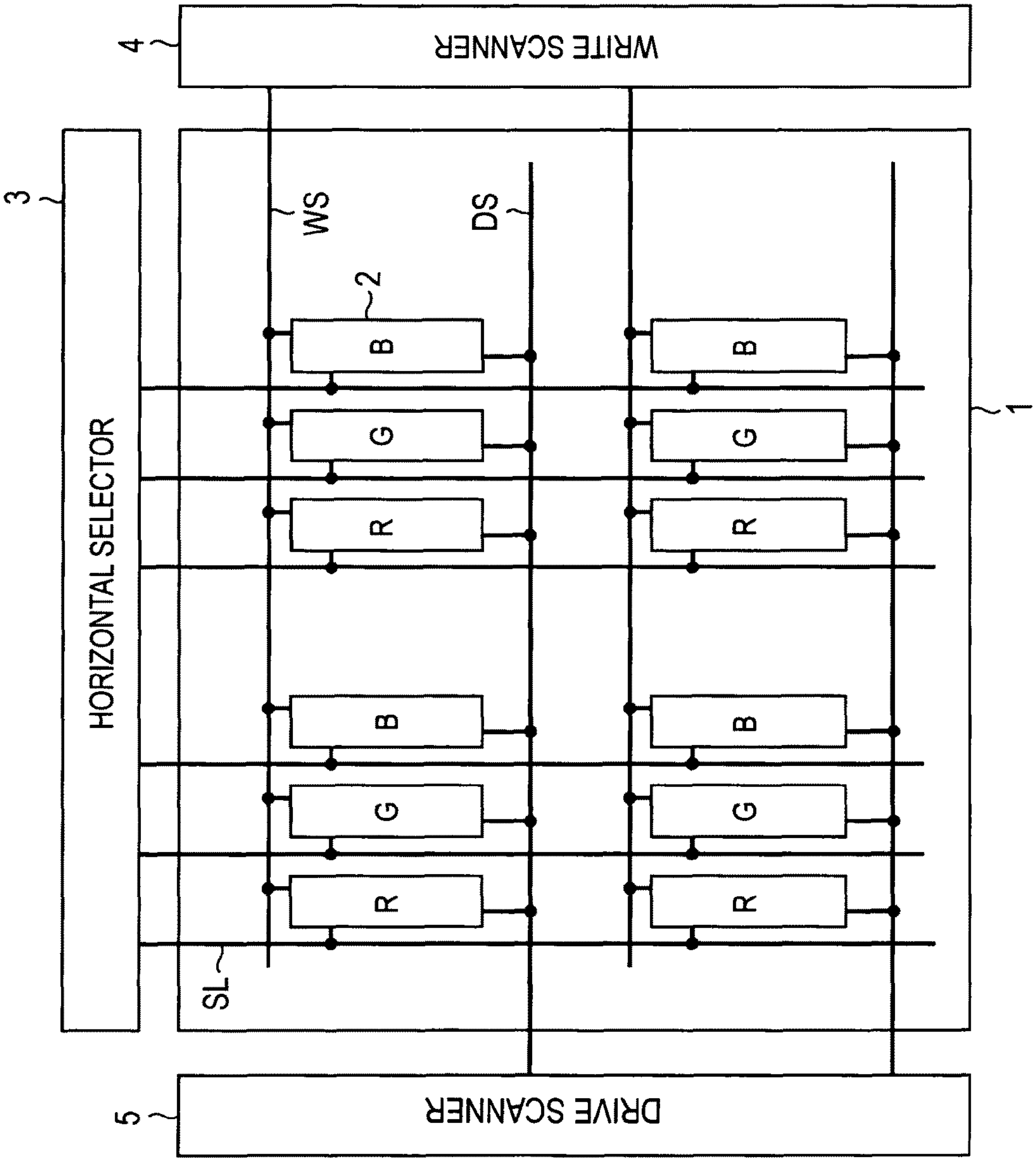
FIG. 21 is a block diagram showing a panel configuration of a display device according to a sixth embodiment of the invention.

FIG. 21 is a block diagram showing a panel configuration of a display device according to a sixth embodiment of the invention. In order to make understanding easier, the codes which are the same as the panel block diagram of the first embodiment shown in FIG. 1 are applied. The display device basically includes a pixel array unit (screen unit) 1 and a drive unit which drives the pixel array unit 1. The pixel array unit 1 includes rows of first scanning lines WS, similarly, rows of second scanning lines DS, columns of signal lines SL, and matrix-state pixels 2 arranged at portions where respective first scanning lines WS and respective signal lines SL intersect. On the other hand, the drive unit: includes a write scanner 4, a drive scanner 5 and a horizontal selector 3. The write scanner 4 performs line-sequential scanning of pixels 2 row by row by outputting a control signal to respective first scanning line WS. The drive scanner 5 also performs ling-sequential scanning of pixels 2 row by row by outputting a control signal to respective second scanning line DS. The timing in which the control signal is outputted differs in the write scanner 4 and the drive scanner 5. The drive scanner 5 is disposed in the drive unit instead of the power supply scanner 6 used in the first embodiment. Since the power supply scanner 6 is removed, the feeling lines are also removed from the pixel array unit 1. Instead of that, a power supply line supplying a fixed power supply potential Vdd is provided in the pixel array unit 1. The horizontal selector (signal driver) 3 supplies a signal voltage and a reference voltage of a video signal to columns of signal lines SL so as to correspond to the line-sequential scanning in the scanners 4 and 5.

[Configuration of a Pixel Circuit]

Figure 22:
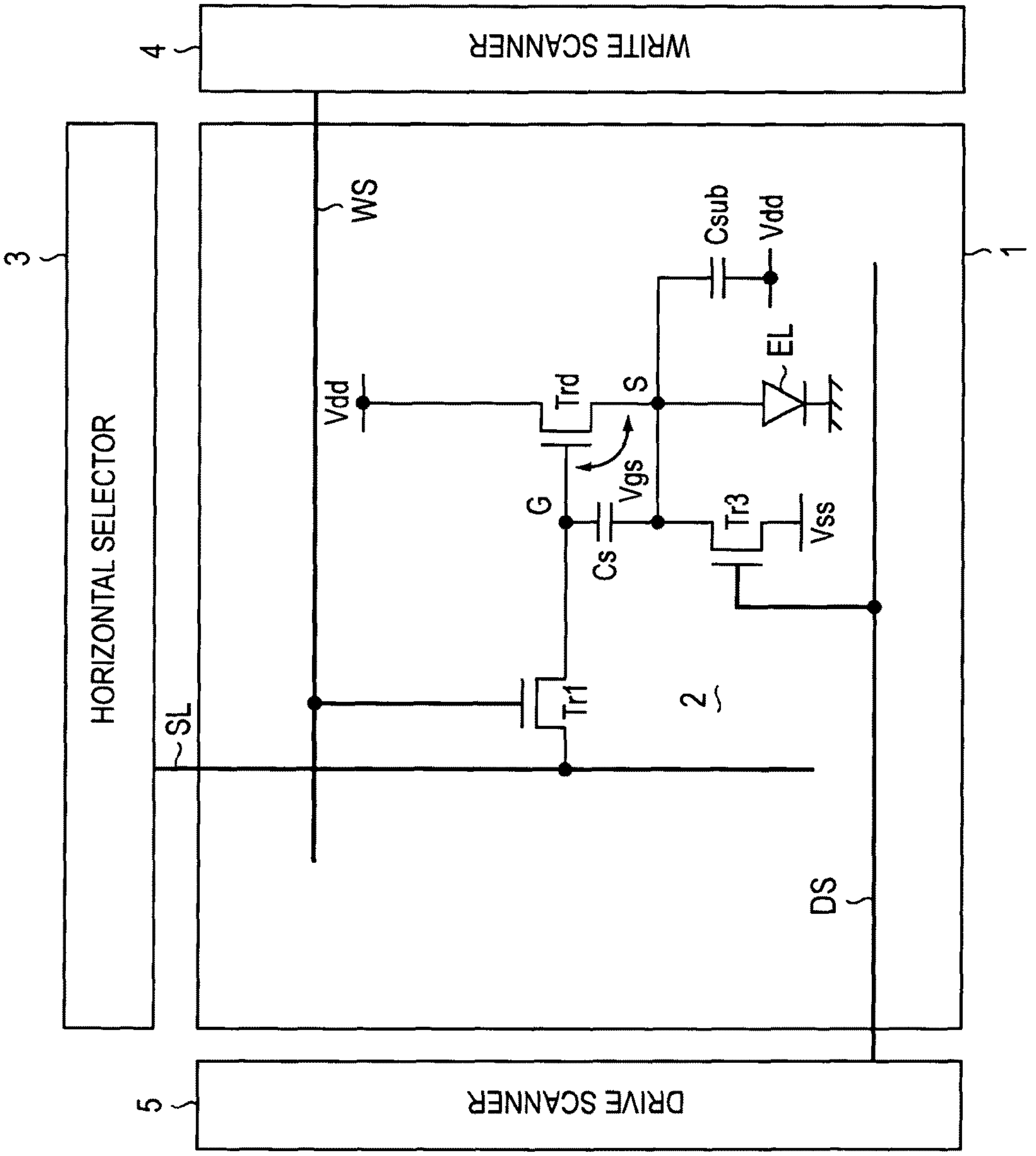
FIG. 22 is a circuit diagram showing a configuration of a pixel circuit.

FIG. 22 shows a configuration of a pixel configuration included in a display panel of the sixth embodiment shown in FIG. 21. The pixel circuit of the first embodiment has two transistors, while the pixel of the present embodiment includes three transistors. As shown in the drawing, the present pixel 2 basically includes a light emitting element EL, a sampling transistor Tr1, a drive transistor Trd, a switching transistor Tr3 and a pixel capacitor Cs. The sampling transistor Tr1 is connected to the scanning line WS at a control end (gate) thereof, connected to the signal line SL at one of a pair of current ends (source/drain) and connected to a control end (gate G) of the drive transistor Trd at the other of the current ends. The drive transistor Trd is connected to a power supply line Vdd at one (drain) of a pair of current ends (source/drain) and connected to an anode of the light emitting element EL at the other (source S) of the current ends. A cathode of the light emitting element EL is connected to a given cathode potential Vcath. The switching transistor Tr3 is connected to the scanning line DS at a control end (gate) thereof, connected to a fixed potential Vss at one of a pair of current ends (source/drain) and connected to a source S of the drive transistor Trd at the other end of the current ends. The pixel capacitor Cs is connected to the control end (gate G) of the drive transistor Trd at one end and connected to the other current end (source S) of the drive transistor Trd at the other end thereof. The other current end of the drive transistor Trd is an output current end with respect to the light emitting element EL and the pixel capacitor Cs. In the present pixel circuit 2, a subsidiary capacitor Csub is connected between the source S of the drive transistor Trd and the power supply Vdd for the purpose of subsidizing the pixel capacitor Cs.

In the above configuration, the write scanner 4 in the drive unit side supplies a control signal for performing switching control of the sampling transistor Tr1 to the first scanning line WS. The drive scanner 5 outputs a control signal for performing switching control of the switching transistor Tr3 to the second scanning line DS. The horizontal selector 3 supplies a video signal (input signal) switching between the signal potential Vsig and the reference potential Vref to the signal line SL. The potentials of the scanning lines WS, DS and signal lines SL vary in accordance with the line-sequential scanning as described above, however, the power supply line is fixed to Vdd. The cathode potential Vcath and the fixed potential Vss are also fixed.

[Operations of the Pixel Circuit]

Figure 23:
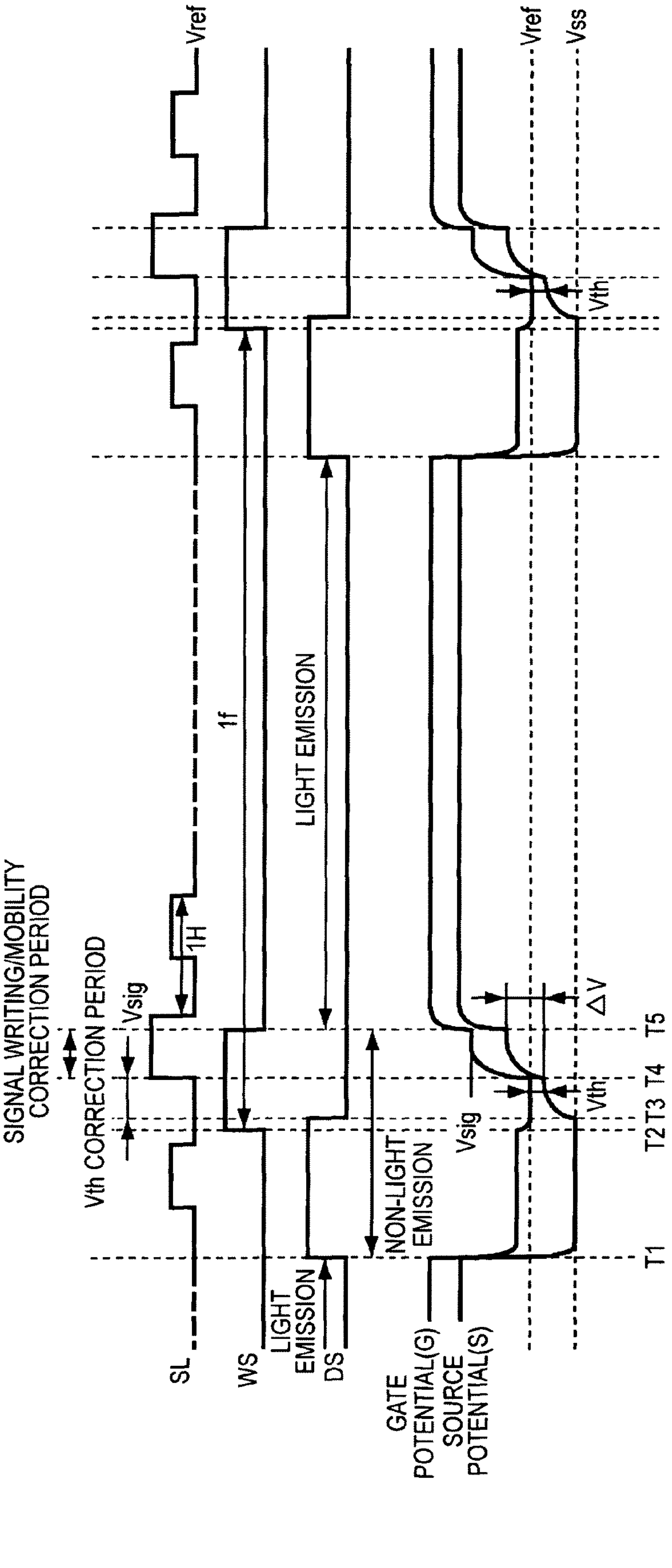
FIG. 23 is a timing chart for explaining operations.

FIG. 23 is a timing chart for explaining operations of the pixel circuit shown in FIG. 22. As shown in the drawing, potential changes in the scanning line WS, the scanning lines DS and the signal line SL are represented in a time axis common to these lines. The sampling transistor Tr1 is an N-channel type, which is turned on when the scanning line WS is in the high level. The switching transistor Tr3 is also the N-channel type, which is turned on when the scanning line DS is in the high level. On the other hand, the video signal supplied to the signal line SL switches between the signal potential Vsig and the reference potential Vref in one horizontal period (1H). The timing chart represents potential changes of the gate G and the source S of the drive transistor Trd so that the time axis corresponds to the potential changes of the first scanning line WS, the second scanning line DS and the signal line SL. The operation state of the drive transistor Trd is controlled in accordance with a potential difference Vgs between the gate G and the source S.

At first, when the pixel enters the non-light emitting period from the light emitting period of the previous frame, the scanning line DS is switched to the high level at a timing T1, and the switching transistor Tr3 is turned on. According to this, the potential of the source S of the drive transistor Trd is set to the fixed potential Vss. At this time, the fixed potential Vss is set to be lower than the sum of a threshold voltage Vthel of the light emitting element EL and the cathode potential Vcath. That is, the fixed potential Vss is set to be Vss<Vthel+Vcath, and the light emitting element EL is in the reverse bias state, a drive voltage Ids does not flow into the light emitting element EL. However, the output current Ids supplied from the drive transistor Trd flows to the fixed potential Vss through the source S.

Subsequently, at a timing T2, the sampling transistor Tr1 is turned on in a state in which the potential of the signal line SL is in Vref. Accordingly, the gate G of the drive transistor Trd is set to the reference potential Vref. Accordingly, the voltage Vgs between the gate G and the source S of the drive transistor Trd will be a value Vref−Vss. Here, Vgs is set to be Vref−Vss>Vth. It is difficult to perform a subsequent threshold correction operation normally if Vref−Vss is not higher than the threshold voltage Vth of the drive transistor Trd. However, the Vgs is Vref−Vss>Vth, therefore, the drive transistor Trd is in the on-state and drain current flows from the power supply potential Vdd to the fixed potential Vss.

After that, at a timing T3, the operation enters a threshold voltage correction period, in which the switching transistor Tr3 is turned off and the source S of the drive transistor Trd is cut off from the fixed potential Vss. Here, as long as the potential of the source S (namely, the anode potential of the light emitting element) is lower than a value obtained by adding the threshold voltage Vthel of the light emitting element EL to the cathode potential Vcath, the light emitting element EL is still in the reverse bias state, and only slight leak current flows. Therefore, most of current supplied from the power supply line Vdd through the drive transistor Trd is used for charging the pixel capacitor Cs and the subsidiary capacitor Csub. Since the pixel capacitor Cs is charged in this manner, the source potential of the drive transistor Trd increases from Vss with time. The source potential of the drive transistor Trd reaches a level Vref−Vth after a fixed period, and Vss just becomes Vth. At this time, the drive transistor Trd is cut off, and the voltage corresponding to Vth is written in the pixel capacitor Cs arranged between the source S and the gate G of the drive transistor Trd. The source voltage Vref−Vth is lower than the value obtained by adding the threshold voltage Vthel of the light emitting element EL to the cathode potential Vcath.

Subsequently, at a timing T4, the process proceeds to the writing period/mobility correction period. At the timing T4, the signal line SL is switched from the reference potential Vref to the signal potential Vsig. The signal potential Vsig is a voltage corresponding to the gray scale. Since the sampling transistor Tr1 is in the on-state at this point, the potential in the gate G of the drive transistor Trd will be Vsig. Accordingly, the drive transistor Trd is turned on and current flows from the power supply line Vdd, therefore, the potential of the source S increases with time. Since the potential of the source S does not still exceed the sum of the threshold voltage Vthel of the light emitting element EL and the cathode voltage Vcath, only slight leak current flows in the light emitting element EL, and most of current supplied from the drive transistor Trd is used for charging the pixel capacitor Cs and the subsidiary capacitor Csub. The potential of the source S increases in the charging process as described above.

Since the threshold voltage correction operation of the drive transistor Trd has already been completed in the writing period, the current supplied from the drive transistor Trd reflects the mobility μ. Specifically, when the mobility μ of the drive transistor Trd is high, the current amount supplied by the drive transistor becomes high, and the potential of the source S increases fast. On the other hand, when the mobility μ is low, the current supply amount of the drive transistor Trd is low and the potential of the source S increases slowly. The output current of the drive transistor Trd is negatively fed back to the pixel capacitor Cs in this manner, as a result, the voltage Vgs between the gate G and the source S of the drive transistor Trd will be a value reflecting the mobility μ, and the voltage Vgs will be a value in which the mobility μ has been completely corrected after a fixed time has passed. That is, in the writing period, the correction of the mobility μ of the drive transistor Trd is simultaneously performed by negatively feeding back current flowing out from the drive transistor Trd to the pixel capacitor Cs.

Lastly, when the process enters the light emitting period of the present frame at a timing T5, the sampling transistor Tr1 is turned off, the gate G of the drive transistor Trd is cut off from the signal line SL. Accordingly, the potential of the gate G can be increased as well as the potential of the source S is also increased with the potential increase of the gate G while maintaining the value of Vgs held in the pixel capacitor Cs to be constant. Accordingly, the reverse bias state of the light emitting element EL is cancelled, and the drive transistor Trd flows the drain current Ids corresponding to Vgs to the light emitting element EL. The potential of the source S increases until current flows in the light emitting element EL, and the light emitting element EL emits light. Here, current/voltage characteristics of the light emitting element will change when the light emitting time become long. Therefore, the potential of the source S also changes. However, the voltage Vgs between the gate and the source of the drive transistor Trd is maintained to be a fixed value by the bootstrap operation, therefore, current flowing in the light emitting element does not change. Accordingly, even in the case that the current/voltage characteristics of the light emitting element EL deteriorate, the fixed current Ids keeps flowing constantly and the luminance of the light emitting element EL does not change. The luminance deterioration of the light emitting element is compensated by further incorporating the burn-in suppression system according to the embodiment of the invention.

Seventh Embodiment

[Block Configuration of a Display Panel]

Figure 24:
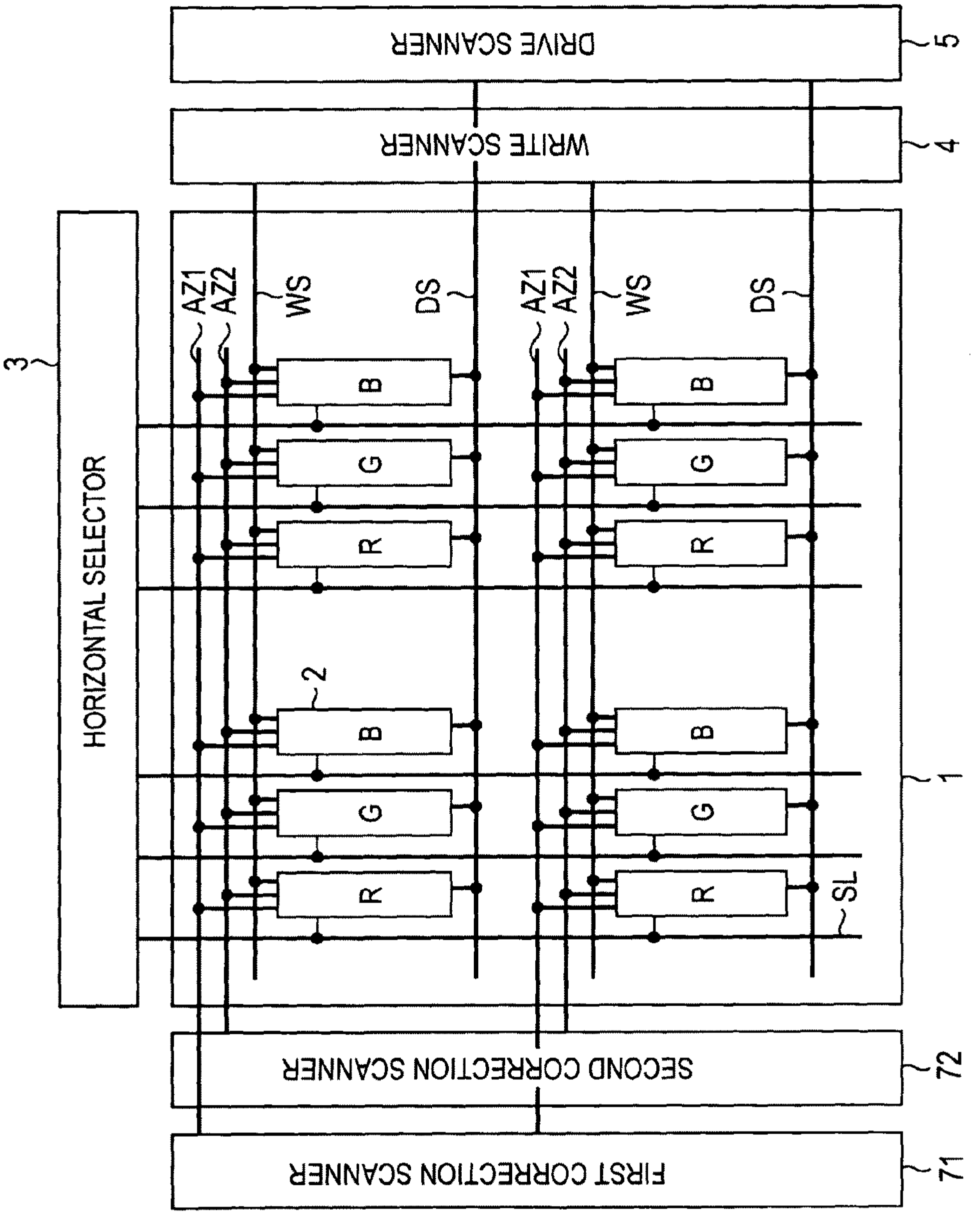
FIG. 24 is a block diagram showing a panel configuration of a display device according to a seventh embodiment of the invention.

FIG. 24 is a block diagram showing a display panel of a display device according to a seventh embodiment of the invention. The display device basically includes a pixel array unit 1, a scanner unit and a signal unit. The scanner unit and the signal unit make a drive unit. The pixel array unit 1 includes first scanning lines WS, second scanning lines DS, third scanning lines AZ1 and fourth scanning lines AZ2 arranged in rows, signal lines SL arranged in columns, matrix-state pixel circuits 2 connected to these scanning lines WS, DS, AZ1, AZ2 and the signal lines SL and plural power supply lines supplying a first potential Vss1, a second potential Vss2 and a third potential Vdd which are necessary for operations of respective pixel circuits 2. The signal unit includes a horizontal selector 3, which supplies video signals to the signal lines SL. The scanner unit includes a write scanner 4, a drive scanner 5, a first correction scanner 71 and a second correction scanner 72, which sequentially scan the pixel circuits 2 row by row by supplying control signals to the first scanning line WS, the second scanning line DS, the third scanning line AZ1 and the fourth scanning line AZ2.

[Configuration of a Pixel Circuit]

Figure 25:
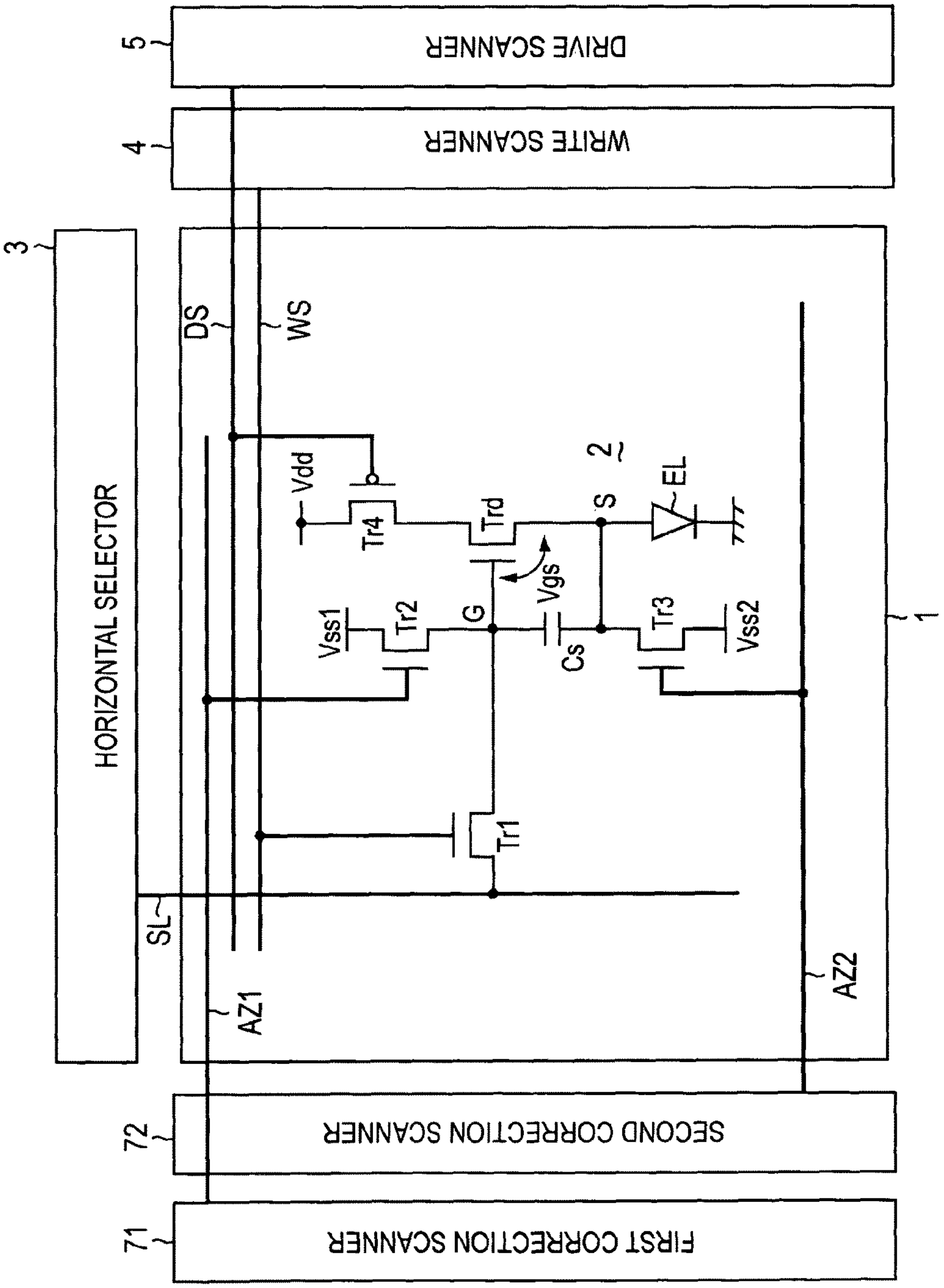
FIG. 25 is a pixel circuit diagram according to the seventh embodiment.

FIG. 25 is a circuit diagram showing a pixel configuration incorporated in the display device shown in FIG. 24. The pixel of the present embodiment is characterized by including five transistors. As shown in the drawing, the pixel circuit 2 includes a sampling transistor Tr1, a drive transistor Trd, a first switching transistor Tr2, a second switching transistor Tr3, a third switching transistor Tr4, a pixel capacitor Cs and a light emitting element EL. The sampling transistor Tr1 becomes conductive in accordance with the signal supplied from the scanning line WS in a given sampling period, performs sampling of a signal potential of a video signal supplied from the signal line SL in the pixel capacitor Cs. The pixel capacitor Cs applies an input voltage Vgs to a gate G of the drive transistor Trd in accordance with the signal potential of the sampled video signal. The drive transistor Trd supplies an output current Ids corresponding to the input voltage Vgs to the light emitting element EL. The light emitting element EL emits light at luminance corresponding to the signal potential of the video signal by the output current Ids supplied from the drive transistor Trd during a given light emitting period.

The first switching transistor Tr2 becomes conductive in accordance with the control signal supplied from the scanning line AZ1 and sets the gate G as a control end of the drive transistor Trd to the first potential Vss1 before the sampling period (video signal writing period). The second switching transistor Tr3 becomes conductive in accordance with the control signal supplied from the scanning line AZ2 and sets a source S as one of current ends of the drive transistor Trd to the second potential Vss2 before the sampling period. The third switching transistor Tr4 becomes conductive in accordance with the control signal supplied from the scanning line DS and connects a drain as the other of the current ends of the drive transistor Trd to the third potential Vdd before the sampling period, thereby storing a voltage corresponding to a threshold voltage Vth of the drive transistor Trd in the pixel capacitor Cs to correct effects of the threshold voltage Vth. The third switching transistor Tr4 further becomes conductive in accordance with the control signal supplied from the scanning line DS again in the light emitting period and connects the drive transistor Trd to the third potential Vdd to allow the output current Ids to flow in the light emitting element EL.

As apparent from the above explanation, the pixel circuit 2 includes five transistors Tr1 to Tr4 and Trd, one pixel capacitor Cs and one light emitting element EL. The transistors Tr1 to Tr3 and Trd are an N-channel type polysilicon TFT. Only the transistor Tr4 is a P-channel type polysilicon TFT. However, the invention is not limited to this, and it is possible to mix N-channel type and P-channel type TFTs appropriately. The light emitting element EL is, for example, a diode-type organic EL device including an anode and a cathode. However, the invention is not limited to this, and the light emitting element includes all types of devices which commonly emit light by current drive.

Figure 26:
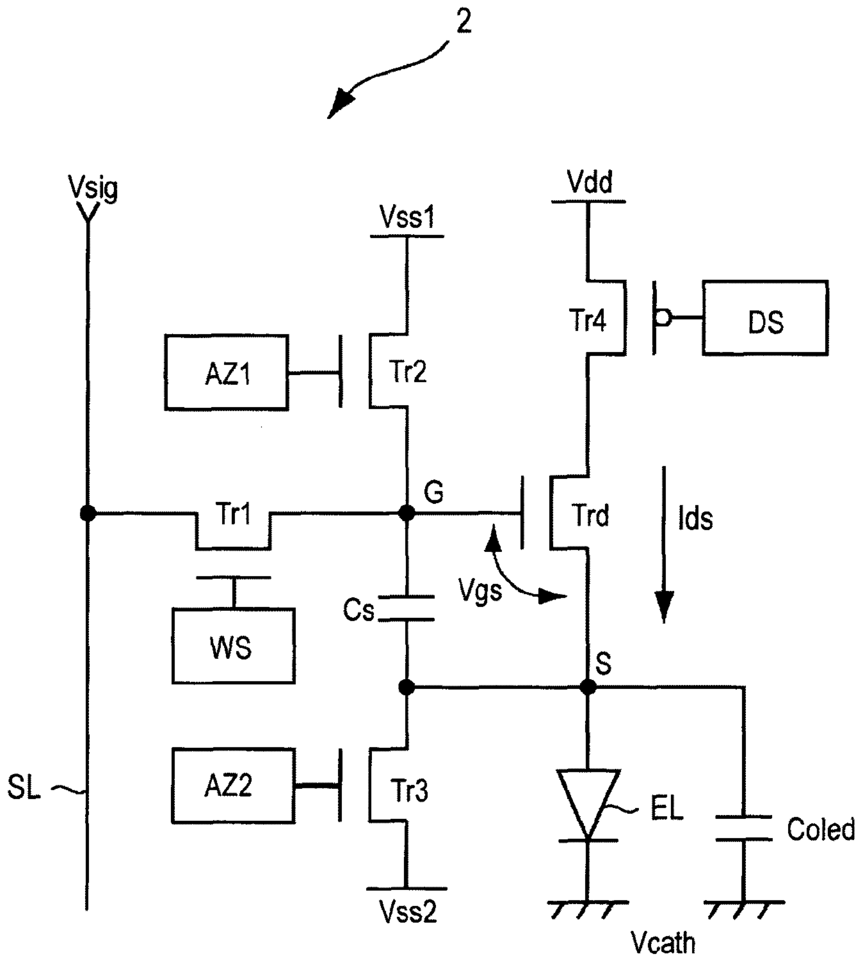
FIG. 26 is also the pixel circuit diagram.

FIG. 26 is a schematic diagram shown by taking only a portion of the pixel circuit 2 from the display panel shown in FIG. 25. In order to make understanding easier, the signal potential Vsig of the video signal sampled by the sampling transistor Tr1, the input voltage Vgs and the output current Ids of the drive transistor Trd, further, a capacitive component Coled included in the light emitting element EL and the like are written. Hereinafter, operations of the pixel circuit 2 according to the embodiment will be explained with reference to FIG. 27.

Operation of Seventh Embodiment

Figure 27:
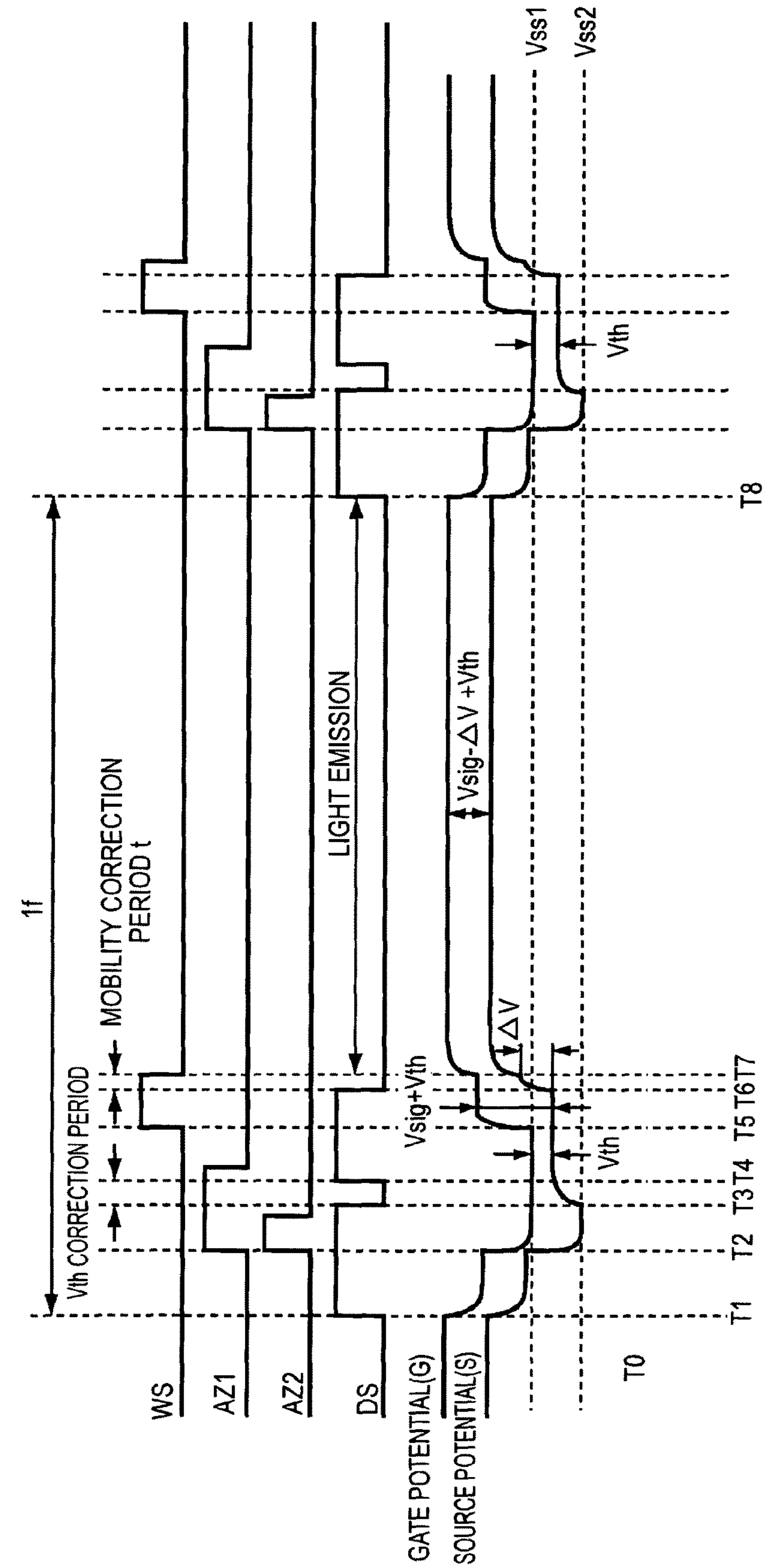
FIG. 27 is a timing chart for explaining operation of the seventh embodiment.

FIG. 27 is a timing chart showing the pixel circuit shown in FIG. 26. FIG. 27 represents waveforms of control signals applied to the respective scanning lines WS, AZ1, AZ2 and DS along the time axis T. In order to simplify the notation, the control signals are represented by the same codes as codes of corresponding scanning lines. Since the transistors Tr1, Tr2 and Tr3 are N-channel type, they are turned on when the scanning lines WS, AZ1, AZ2 are respectively in the high level, and turned off in the low level. On the other hand, the transistor Tr4 is a P-channel type, therefore, it is turned off when the scanning line DS is in the high level, and turned on in the low level. The timing chart also represents potential changes of the gate G and the source S of the drive transistor Trd in addition to the waveforms of respective control signals WS, AZ1, AX2 and DS.

In the timing chart shown in FIG. 27, timings T1 to T8 are counted as one frame (1/*f*). Respective rows in the pixel array are sequentially scanned once in one frame. The timing chart represents waveforms of respective control signals WS, AZ1, AZ2 and DS applied to pixels of one row.

At a timing T0 before the present frame starts, all control signals WS, AZ1, AZ2, and DS are in the low level. Therefore, the N-channel type transistors Tr1, Tr2 and Tr3 are in the off-state, while only the p-channel type transistor Tr4 is in the on-state. Since the drive transistor Trd is connected to the power supply Vdd through the transistor Tr4 which is in the on-state, the drive transistor Trd supplies the output current Ids to the light emitting element EL in accordance with the given input voltage Vgs. Therefore, the light emitting element EL emits light at the timing T0. At this time, the input voltage Vgs applied to the drive transistor Trd is represented by the difference between the gate potential (G) and the source potential (S).

At the timing T1 when the present frame starts, the control signal DS is switched from the low level to the high level. Accordingly, the switching transistor Tr4 is turned off and the drive transistor Trd is cut off from the power supply Vdd, therefore, light emission is stopped and the device enters the non-light emitting period. Therefore, all transistors Tr1 to Tr4 are turned off at the timing T1.

Subsequently, when proceeding to the timing T2, the control signals AZ1 and AZ2 are in the high level, therefore, the switching transistors Tr2 and Tr3 are turned on. As a result, the gate G of the drive transistor Trd is connected to the reference potential Vss1 and the source S is connected to the reference potential Vss2. Here, Vss1−Vss2>Vth is satisfied, and a preparation for the Vth correction which will be performed at the timing T3 afterward is made by allowing Vss1−Vss2 to be Vgs>Vth. In other words, the period T2 to T3 corresponds to a reset period of the drive transistor Trd. When the threshold voltage of the light emitting element EL is VthEL, setting is made to be VthEL>Vss2. Accordingly, a minus bias is applied to the light emitting element EL, and the element becomes in the so-called reverse bias state. The reverse bias state is necessary for normally performing the Vth correction operation and the mobility correction operation which will be performed later.

At the timing T3, the control signal AZ2 is in the low level as well as the control signal DS is also in the low level just after that. Accordingly, the transistor Tr3 is turned off, while the transistor Tr4 is turned on. As a result, the drain current Ids flows into the pixel capacitor Cs, and the Vth correction operation is started. At this time, the gate G of the drive transistor Trd is maintained to be Vss1, and the current Ids flows until the drive transistor Trd is cut off. When the drive transistor Trd is cut off, the source potential (S) of the drive transistor Trd will be Vss1−Vth. The control signal DS is returned to be in the high level at the timing T4 when the drain current is cut off to allow the switching transistor Tr4 to be turned off. Further, the control signal AZ1 is also returned to be in the low level to allow the switching transistor Tr2 to be turned off. As a result, Vth is held and fixed in the pixel capacitor Cs. As described above, a period from the timing T3 to T4 is a period during which the threshold voltage Vth of the drive transistor Trd is detected. Here, the detection period T3 to T4 is referred to as the Vth detection period.

After the Vth correction is performed as in the above manner, the control signal WS is switched to the high level at the timing T5 to turn on the sampling transistor Tr1 as well as to write the video signal Vsig in the pixel capacitor Cs. The pixel capacitor Cs is sufficiently small as compared with the equivalent capacitor Coled of the light emitting element EL. As a result, most of the video signal Vsig is written in the pixel capacitor Cs. To be accurate, Vsig−Vss1 which is the difference between Vss1 and Vsig is written in the pixel capacitor Cs. Therefore, the voltage Vgs between the gate G and the source S of the drive transistor Trd will be a level obtained by adding Vsig−Vss1 sampled at this time to Vth which has been detected and held in advance (Vsig−Vss1+Vth). When Vss1 is assumed to be 0V for making the following explanation easier, the voltage Vgs between the gate and the source will be Vsig+Vth as shown in the timing chart of FIG. 27. The sampling of the video signal Vsig is performed until the timing T7 when the control signal WS is returned to be in the low level. That is, a period from the timing T5 to T7 corresponds to a sampling period (video signal writing period).

At the timing T6 before the timing T7 when the sampling period ends, the control signal DS is in the low level and the switching transistor Tr4 is turned on. Accordingly, the drive transistor Trd is connected to the power supply Vdd, therefore, the pixel circuit proceeds to the light emitting period from the non-light emitting period. In a period T6 to T7 when the sampling transistor Tr1 is still in the on-state as well as the switching transistor Tr4 is turned on, the mobility correction of the drive transistor Trd is performed. That is, in the example, the mobility correction is performed in the period T6 to T7 when the later portion of the sampling period and the top portion of the light emitting period overlap. At the top of the light emitting period when the mobility correction is performed, the light emitting element EL is in the reverse bias state, therefore, the element does not emit light. In the mobility correction period T6 to T7, the drain current Ids flows in the drive transistor Trd in the state in which the gate G of the drive transistor Trd is fixed to the level of the video signal Vsig. Here, since the light emitting element EL is in the reverse bias state by performing setting Vss1−Vth<VthEL in advance, the light emitting element EL shows simple capacitor characteristics, not diode characteristics. Therefore, the current Ids flowing in the drive transistor Trd is written in the capacitor C=Cs+Coled obtained by coupling the pixel capacitor Cs with the equivalent capacitor Coled of the light emitting element EL together. Accordingly, the source potential (S) of the drive transistor Trd is increased. In the timing chart of FIG. 27, the increase amount is represented by ΔV. The increase amount ΔV is subtracted from the voltage Vgs between the gate and the source held in the pixel capacitor Cs resultingly, therefore, it means that negative feedback has been performed. It is possible to correct the mobility μ by negatively feeding back the output current Ids of the drive transistor Trd to the input voltage Vgs of the same drive transistor Trd in the above manner. The negative-feedback amount ΔV can be optimized by adjusting a time width "t" of the mobility correction period T6 to T7.

At the timing T7, the control signal WS is in the low level to allow the sampling transistor Tr1 to be turned off. As a result, the gate G of the drive transistor Trd is cut off from the signal line SL. Since the application of the video signal Vsig is released, the gate potential (G) of the drive transistor Trd is possible to increase with the source potential (S). The voltage Vgs between the gate and the source held in the pixel capacitor Cs maintains a value (Vsig−ΔV+Vth) during the period. The reverse bias state of the light emitting element EL is cancelled with the increase of the source potential (S), therefore, the light emitting element EL actually starts emitting light by the inflow of the output current Ids. The relation between the drain current Ids and the gate voltage Vgs at this time can be given by the following formula by substituting Vsig−ΔV+Vth in Vgs of the characteristic formula 1.

$$Ids = k\mu(Vgs - Vth)^2 = k\mu(Vsig - \Delta V)^2$$

In the above formula, k=(1/2)(W/L)Cox. According to the characteristic formula, it is conceivable that a term of Vth is cancelled and the output current Ids supplied to the light emitting element EL does not depend on the threshold Vth of the drive transistor Trd. The drain current Ids is basically determined by the signal voltage Vsig of the video signal. In other words, the light emitting element EL emits light at luminance corresponding to the video signal Vsig. At that time, Vsig is corrected by negative feedback amount ΔV. The correction amount ΔV works so as to cancel out effects of the mobility μ just positioned at coefficient positions in the characteristic formula. Therefore, the drain current Ids substantially depends on only the video signal Vsig.

Lastly, at the timing T8, the control signal DS is in the high level and the switching transistor Tr4 is turned off, then, the light emission ends as well as the present frame ends. After that, the process proceeds to the next frame, where the Vth correction operation, the mobility correction operation and the light emitting operation will be repeated.

Application Example

Figure 28:
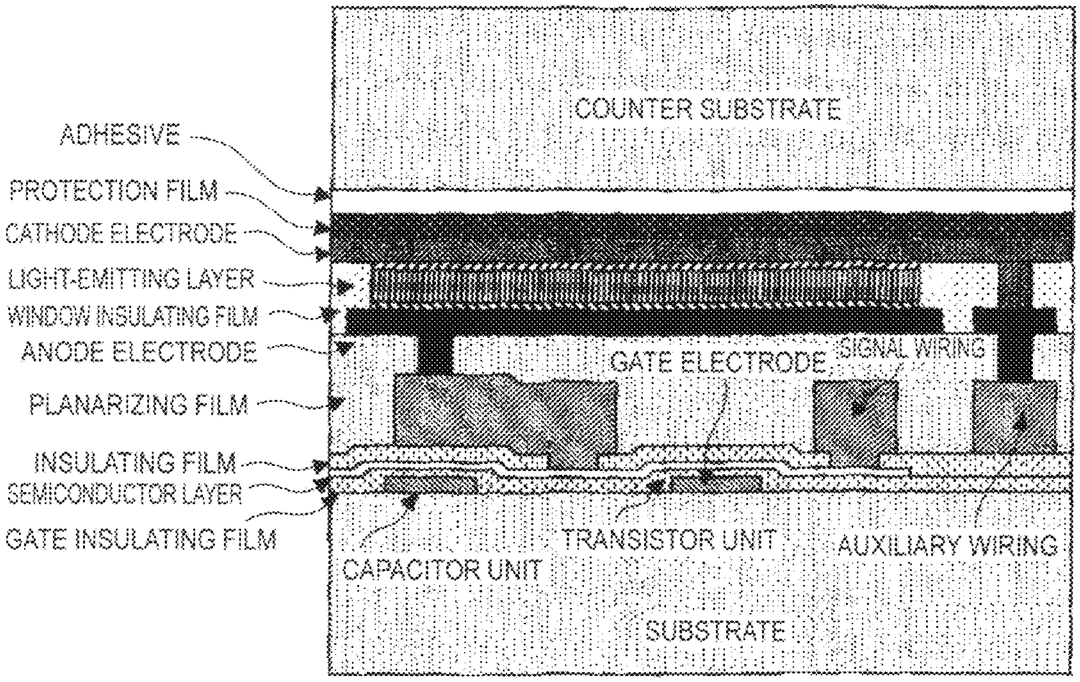
FIG. 28 is a cross-sectional view showing a device structure of a display device according to an application example of the invention.

The display device according to the embodiments of the invention has a thin-film device structure as shown in FIG. 28. In FIG. 28, a TFT portion has a bottom gate structure (a gate electrode is positioned below a channel PS layer). Concerning the TFT portion, there are variations such as a sandwich gate structure (the channel PS layer is sandwiched by upper and lower gate electrodes) and a top gate structure (the gate electrode is positioned above the channel PS layer). The drawing shows a schematic cross-sectional structure of a pixel formed on an insulative substrate. As shown in the drawing, the pixel has a transistor unit including plural transistors (one TFT is shown as an example in the drawing), a capacitor unit including a pixel capacitor and the like, and a light emitting unit including an organic EL element and the like. On the substrate, the transistor unit and the capacitor unit are formed by a TFT process, then, the light emitting unit such as the organic EL element is stacked thereon. Further, a transparent counter substrate is bonded thereon through an adhesive to obtain a flat panel.

Figure 29:
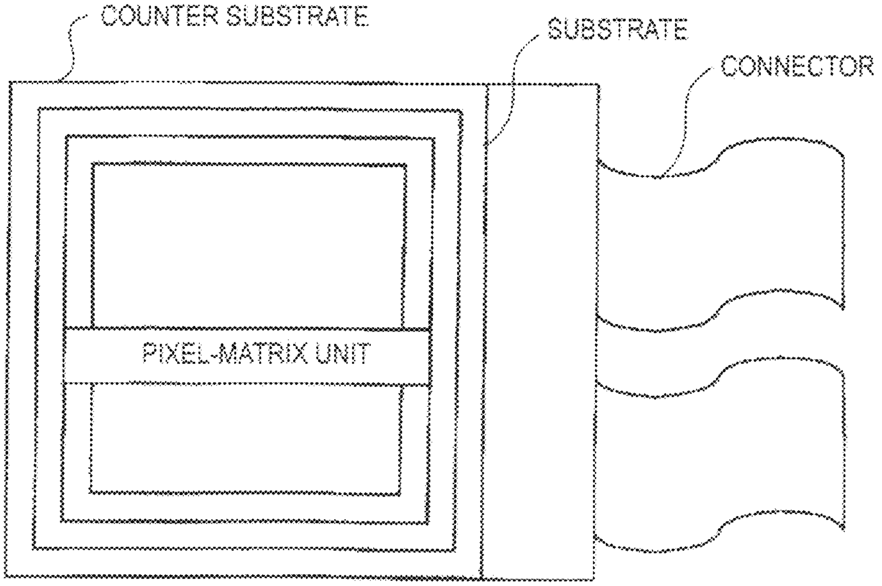
FIG. 29 is a plan view showing a module structure of the display device according to the application example of the invention.

The display device according to the embodiments of the invention includes a flat-module shaped device as shown in FIG. 29. For example, a pixel array unit in which pixels each having an organic EL element, a thin-film transistor, a thin-film capacitor and the like are integrally formed in a matrix state is provided, and a counter substrate made of glass or the like is bonded by arranging an adhesive so as to surround the pixel array unit (pixel matrix unit) to obtain a display module. In the transparent counter substrate, color filters, a protection film, a shielding film and the like may be provided, if necessary. It is also preferable that the display module is provided with, for example, a FPC (flexible print circuit) as a connector for inputting and outputting signals and the like with respect to the pixel array circuit from the outside.

The display device according to the embodiments of the invention explained in the above includes the flat panel shape, which can be applied to various electronic products, for example, digital camera, a notebook personal computer, a cellular phone, a video camera and the like. The display device can be applied to displays of electronic products of various fields which can display a drive signal inputted to the electronic products or generated in the electronic product as an image or video. Examples of electronic products to which the above display device is applied will be shown below. The electronic product basically includes a main body which processes information and a display which displays information inputted to the main body or outputted from the main body.

Figure 30:
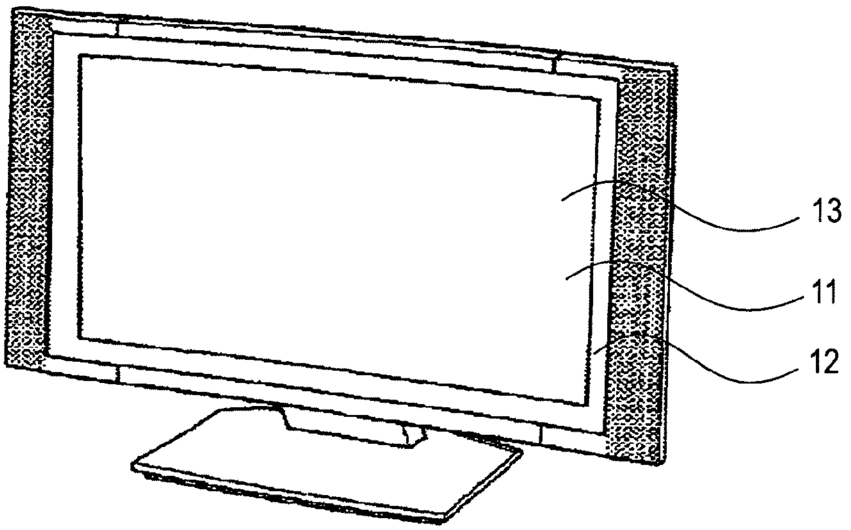
FIG. 30 is a perspective view showing a television set including the display device according to the application example of the invention.

FIG. 30 shows a television set to which the invention is applied, including a video display screen 11 having a front panel 12, a filter glass 13 and the like, which is fabricated by using the display device according to the embodiment of the invention as the video display screen 11.

Figure 31:
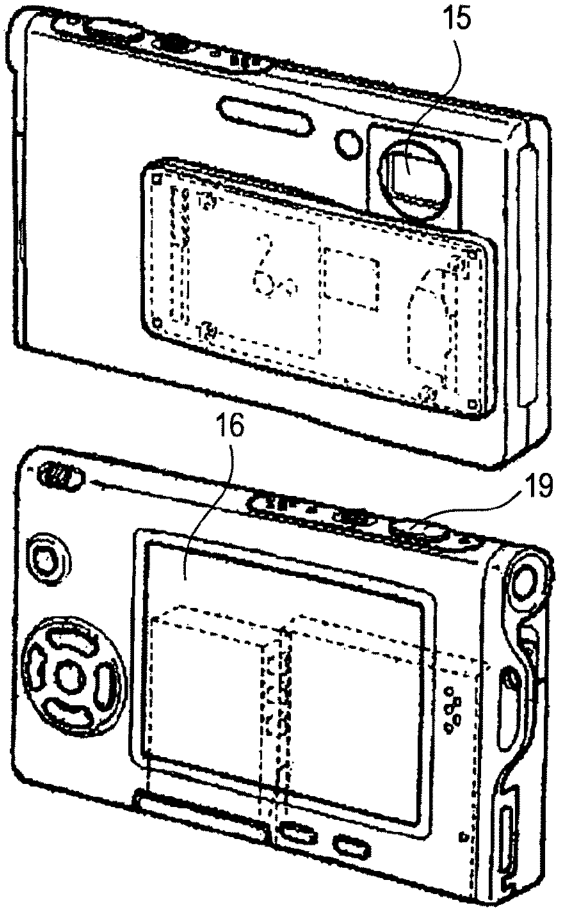
FIG. 31 is a perspective view showing a digital still camera including the display device according to the application example of the invention.

FIG. 31 shows a digital camera to which the invention is applied, the upper view is a front view and the lower view is a back view. The digital camera includes an imaging lens, a light emitting unit for flash 15, a display unit 16, a control switch, a menu switch, a shutter 19 and the like, which is fabricated by using the display device according to embodiments of the invention as the display unit 16.

Figure 32:
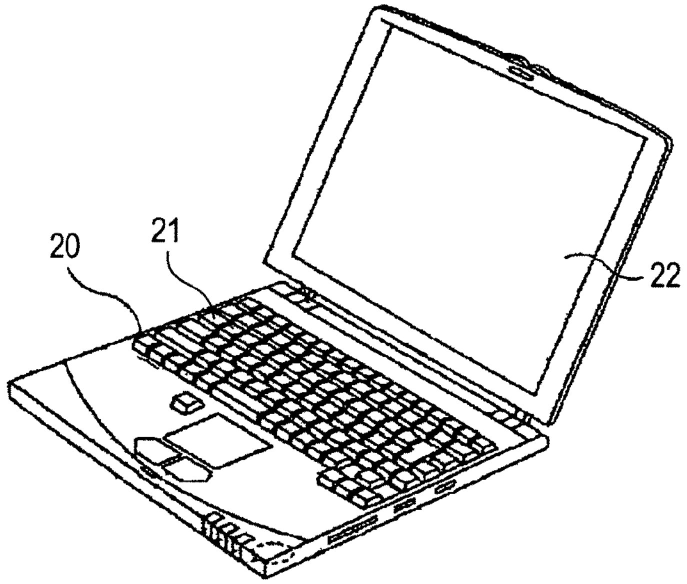
FIG. 32 is a perspective view showing a notebook personal computer including the display device according to the application example of the invention.

FIG. 32 shows a notebook personal computer to which the invention is applied, in which a main body 20 includes a keyboard 21 operated when inputting characters and the like, in which a main-body cover includes a display unit 22 displaying images, and which is fabricated by using the display device according to the embodiments of the invention as the display unit 22.

Figure 33:
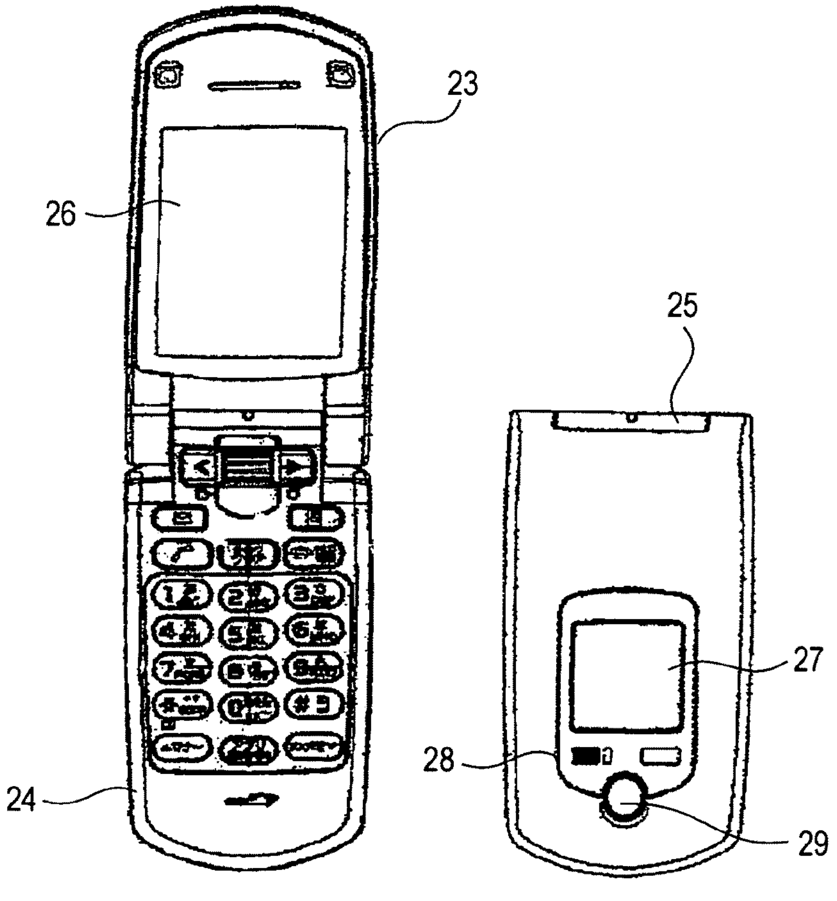
FIG. 33 is a schematic view showing a portable terminal device including the display device according to the application example of the invention.

FIG. 33 shows a portable terminal device to which the invention is applied. The left view represents an open state and the right view represents a closed state. The portable terminal device includes an upper casing 23, a lower casing 24, a connection unit (hinge unit in this case) 25, a display 26, a sub-display 27, a picture light 28, a camera 29 and the like. The portable terminal device is fabricated by using the display device according to the embodiments of the invention as the display 26 or the sub-display 27.

Figure 34:
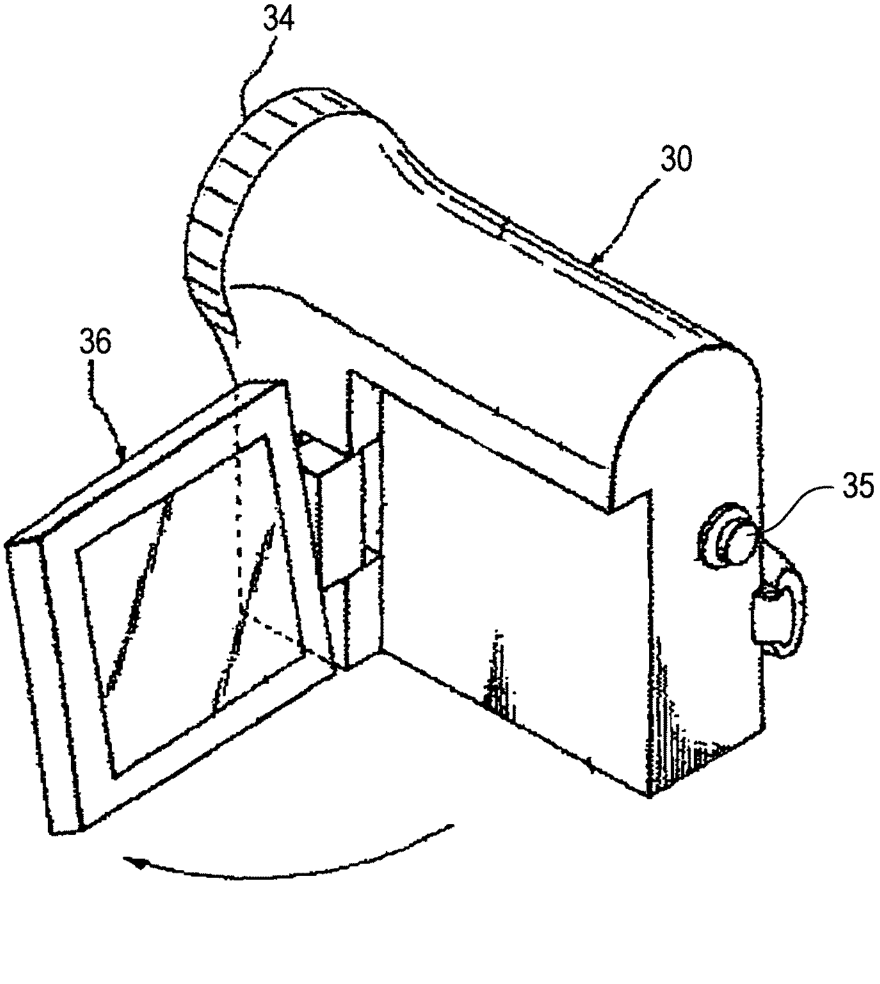
FIG. 34 is a perspective view showing a video camera including the display device according to the application example of the invention.

FIG. 34 shows a video camera to which the invention is applied, which includes a main body 30, a lens 34 for imaging subjects at a side surface facing the front, a start/stop switch 35 at the time of imaging, a monitor 36 and the like, and which is fabricated by using the display device according to the embodiments of the invention as the monitor 36.

The present application contains subject matter related to that disclosed in Japanese Priority Patent Application JP 2008-286781 filed in the Japan Patent Office on Nov. 7, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a screen unit;

a drive unit;

a signal processing unit; and a selector, wherein the screen unit includes rows of scanning lines, columns of signal lines, pixel circuits forming a matrix, and a plurality of light sensors, the drive unit includes a scanner supplying a control signal to the scanning lines and a driver supplying a video signal to the signal lines, the pixel circuits are sectioned into plural pixel regions each having plural pixel circuits and a boundary, the pixel circuit emits light in accordance with the video signal, each of the plurality of light sensors resides within the boundary of a respective one of the plural pixel regions and outputs a luminance signal in accordance with the light emission, the selector supplies plural luminance signals to the signal processing unit by switching the signals, and the signal processing unit corrects the video signal in accordance with the luminance signals and supplies the video signal to the driver, wherein the plurality of light sensors arranged to correspond to the plural pixel regions are grouped into blocks by a given number of the plurality of light sensors, the signal processing unit processes the luminance signals by each block, wherein the display device further comprises a converter converting analog luminance signals outputted from the plurality of light sensors into digital luminance signals and supplying the signals into the signal processing unit, and wherein the converter is arranged to correspond to each block.

2. The display device according to claim 1, further comprising:

an amplifier amplifying the luminance signals outputted from the plurality of light sensors and supplying the signals to the signal processing unit, wherein the amplifier is arranged to correspond to each block.

3. The display device according to claim 1, wherein the signal processing unit supplies a video signal for display during a display period in which video is displayed in the screen unit, and supplies a video signal for luminance detection during a detection period in which video is not displayed in the screen unit.

4. The display device according to claim 3, wherein the signal processing unit supplies the video signal for luminance detection in each frame and allows only pixel circuits of detection targets to emit light.

5. The display device according to claim 1, wherein the signal processing unit compares a first luminance signal outputted from one of the plurality of light sensors during a first period with a second luminance signal outputted from one of the plurality of light sensors during a second period after the first period, corrects the video signal in accordance with the comparison result and supplies the signal to the driver.

6. An electronic product comprising:

a main body; and a display displaying information inputted to the main body or information outputted from the main body, wherein the display includes a screen unit, a drive unit, a signal processing unit and a selector, the screen unit includes rows of scanning lines, columns of signal lines, pixel circuits forming a matrix, and a plurality of light sensors, the drive unit includes a scanner supplying a control signal to the scanning lines and a driver supplying a video signal to the signal lines, the pixel circuits are sectioned into plural pixel regions each having plural pixel circuits and a boundary, the pixel circuit emits light in accordance with the video signal, each of the plurality of light sensors resides within the boundary of a respective one of the plural pixel regions and outputs a luminance signal in accordance with the light emission, the selector supplies plural luminance signals to the signal processing unit by switching the signals, and the signal processing unit corrects the video signal in accordance with the luminance signals and supplies the video signal to the driver, wherein the plurality of light sensors arranged to correspond to the plural pixel regions are grouped into blocks by a given number of the plurality of light sensors, the signal processing unit processes the luminance signals by each block, wherein the display device further comprises a converter converting analog luminance signals outputted from the plurality of light sensors into digital luminance signals and supplying the signals into the signal processing unit, and wherein the converter is arranged to correspond to each block.

* * * * *